(12) United States Patent
Shin et al.

(10) Patent No.: US 9,703,353 B2
(45) Date of Patent: Jul. 11, 2017

(54) METHOD AND ELECTRONIC DEVICE FOR REDUCING CURRENT CONSUMPTION BY THE ELECTRONIC DEVICE

(71) Applicant: Samsung Electronics Co., Ltd., Gyeonggi-do (KR)

(72) Inventors: Yeung Seob Shin, Gyeonggi-do (KR); Chae Man Lim, Seoul (KR); Ji Kwang Kang, Gyeonggi-do (KR); Tae Yoon Kim, Gyeonggi-do (KR); Tae Hoon Oh, Gyeonggi-do (KR); Seoung Bum Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 32 days.

(21) Appl. No.: 14/832,315

(22) Filed: Aug. 21, 2015

(65) Prior Publication Data

US 2016/0054778 A1 Feb. 25, 2016

(30) Foreign Application Priority Data

Aug. 21, 2014 (KR) ........................ 10-2014-0109238

(51) Int. Cl.
*G06F 1/32* (2006.01)
*H04W 52/02* (2009.01)

(52) U.S. Cl.
CPC ............ *G06F 1/3206* (2013.01); *G06F 1/329* (2013.01); *G06F 1/3293* (2013.01); *H04W 52/028* (2013.01); *H04W 52/0248* (2013.01); *Y02B 60/121* (2013.01); *Y02B 60/50* (2013.01)

(58) Field of Classification Search
CPC ...... G06F 1/3206; G06F 1/3293; G06F 1/329; H04W 52/0248; H04W 52/028
See application file for complete search history.

(56) References Cited

U.S. PATENT DOCUMENTS

| 2005/0064911 | A1 | 3/2005 | Chen et al. |
| 2005/0182980 | A1* | 8/2005 | Sutardja ................ G06F 1/1616 713/320 |
| 2008/0244289 | A1* | 10/2008 | LeProwse ............... G06F 9/441 713/320 |
| 2010/0058082 | A1 | 3/2010 | Locker et al. |
| 2010/0069127 | A1* | 3/2010 | Fiennes ............... H04W 52/028 455/574 |
| 2011/0019600 | A1 | 1/2011 | Ping et al. |
| 2012/0230236 | A1 | 9/2012 | Kert et al. |
| 2013/0219045 | A1 | 8/2013 | Agarwal et al. |

(Continued)

FOREIGN PATENT DOCUMENTS

WO  WO 2012/163428  12/2012

OTHER PUBLICATIONS

European Search Report dated Nov. 17, 2015 issued in counterpart application No. 15182035.4-1959, 6 pages.

Primary Examiner — Stefan Stoynov
(74) Attorney, Agent, or Firm — The Farrell Law Firm, P.C.

(57) ABSTRACT

An electronic device and a method for reducing current consumption in the electronic device are provided. The electronic device includes a communication processor configured to collect an event associated with operation of an application while an application processor is in a sleep state, and a communication interface configured to transmit a message corresponding to the collected event to an external electronic device.

14 Claims, 18 Drawing Sheets

(56) References Cited

U.S. PATENT DOCUMENTS

2013/0272111 A1 10/2013 Yu et al.
2014/0090047 A1 3/2014 Yuan et al.
2014/0122710 A1 5/2014 Lu

* cited by examiner

Message types for EPS mobility management

```
Bits
8 7 6 5 4 3 2 1

0 1 - - - - - -          EPS mobility management messages 0 1 0 0 0 0 0 1          Attach request
0 1 0 0 0 0 1 0          Attach accept
0 1 0 0 0 0 1 1          Attach complete
0 1 0 0 0 1 0 0          Attach reject
0 1 0 0 0 1 0 1          Detach request
0 1 0 0 0 1 1 0          Detach accept 0 1 0 0 1 0 0 0          Tracking area update request
0 1 0 0 1 0 0 1          Tracking area update accept
0 1 0 0 1 0 1 0          Tracking area update complete
0 1 0 0 1 0 1 1          Tracking area update reject 0 1 0 0 1 1 0 0          Extended service request
0 1 0 0 1 1 1 0          Service reject 0 1 0 1 0 0 0 0          GUTI reallocation command
0 1 0 1 0 0 0 1          GUTI reallocation complete
0 1 0 1 0 0 1 0          Authentication request
0 1 0 1 0 0 1 1          Authentication response
0 1 0 1 0 1 0 0          Authentication reject
0 1 0 1 1 1 0 0          Authentication failure
0 1 0 1 0 1 0 1          Identity request
0 1 0 1 0 1 1 0          Identity response
0 1 0 1 1 1 0 1          Security mode command
0 1 0 1 1 1 1 0          Security mode complete
0 1 0 1 1 1 1 1          Security mode reject 0 1 1 0 0 0 0 0          EMM status
0 1 1 0 0 0 0 1          EMM information
0 1 1 0 0 0 1 0          Downlink NAS transport
0 1 1 0 0 0 1 1          Uplink NAS transport
0 1 1 0 0 1 0 0          CS Service notification
0 1 1 0 1 0 0 0          Downlink generic NAS transport
0 1 1 0 1 0 0 1          Uplink generic NAS transport
```

FIG.11

METHOD AND ELECTRONIC DEVICE FOR REDUCING CURRENT CONSUMPTION BY THE ELECTRONIC DEVICE

PRIORITY

This application priority under 35 U.S.C. §119(a) to Korean Patent Application Serial No. 10-2014-0109238, which was filed in the Korean Intellectual Property Office on Aug. 21, 2014, the entire disclosure of which is incorporated herein by reference.

BACKGROUND

1. Field of the Disclosure

The present disclosure relates generally to a technology for reducing current consumption by an electronic device.

2. Description of the Related Art

Existing electronic devices, such as smartphones, may receive information transmitted from another electronic device thereto through a server device or a base station device. Accordingly, electronic devices may be required to continuously maintain connections to the server device or the base station device and/or periodically notify the server device or the base station device that the electronic device operates normally.

For example, a conventional electronic device maintains a connection state related to an operation of a specific application by use of an application processor. However, because the application processor performs various functions of the electronic device, current consumption of the application processor is generally high. Therefore, the conventional electronic device must support high current consumption of the application processor in order to maintain a connection to the server device or the base station device and/or to periodically send a notification of the normal operation thereof (e.g., a notification for periodic scheduling event processing).

SUMMARY

The present disclosure is designed to address at least the problems and/or disadvantages described above and to provide at least the advantages described below.

Accordingly, an aspect of the present disclosure is to provide an electronic device and method for reducing current consumption of the electronic device during event processing.

In accordance with an aspect of the present disclosure, an electronic device is provided. The electronic device includes a communication processor configured to collect an event associated with operation of an application while an application processor is in a sleep state, and a communication interface configured to transmit a message corresponding to the collected event to an external electronic device.

In accordance with another aspect of the present disclosure, a method for reducing current consumption is provided. The method includes collecting, by a communication processor, an event associated with operation of an application while an application processor is in a sleep state, and transmitting a message corresponding to the collected event to an external electronic device corresponding to control by the communication processor.

In accordance with another aspect of the present disclosure, a chipset for reducing current consumption in an electronic device is provided. The chipset is configured to collect, by a communication processor, an event associated with operation of an application while an application processor is in a sleep state, and transmit a message corresponding to the collected event to an external electronic device corresponding to control by the communication processor.

BRIEF DESCRIPTION OF THE DRAWINGS

The above and other aspects, features, and advantages of certain embodiments of the present disclosure will be more apparent from the following detailed description, when taken in conjunction with the accompanying drawings, in which:

FIG. 11 illustrates an example of message types related to a channel release according to an embodiment of the present disclosure;

DETAILED DESCRIPTION OF EMBODIMENTS OF THE DISCLOSURE

Figure 1:
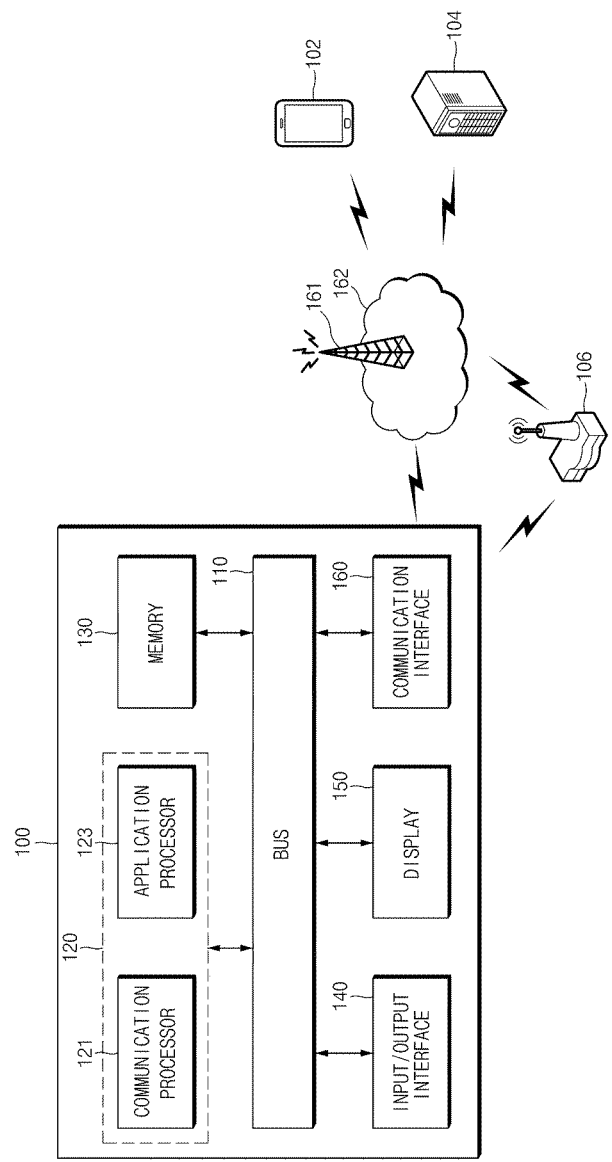
FIG. 1 illustrates an electronic device in a network environment according to an embodiment of the present disclosure.

Hereinafter, various embodiments of the present disclosure will be described in detail with reference to the accompanying drawings. However, it should be understood that the present disclosure is not limited to specific embodiments, but rather includes various modifications, equivalents and/or alternatives thereof.

Regarding description of the drawings, like reference numerals may refer to like elements.

The terminology used herein is not for limiting the present disclosure but for describing various embodiments. The terms in a singular form may include plural forms unless otherwise specified.

Further, the terms used herein, including technical or scientific terms, have the same meanings as understood by those skilled in the art. Commonly-used terms defined in a dictionary may be interpreted as having meanings that are the same as or similar to the dictionary definitions in the related art, and should not be interpreted in an idealized or overly formal sense unless otherwise defined explicitly. Depending on context, even the terms defined herein should not be such interpreted as to exclude various embodiments of the present disclosure.

For example, the terms "have", "may have", "include", "may include" and "comprise" indicate the existence of a corresponding feature (e.g., a number, a function, an operation, or an element), but do not exclude the existence of an additional feature.

The terms "A or B", "at least one of A and/or B", and "one or more of A and/or B" may include all possible combinations of items listed together. For example, the terms "A or B", "at least one of A and B", and "at least one of A or B" may indicate (1) including at least one A, (2) including at least one B, and (3) including at least one A and at least one B.

The terms "first", "second", etc., used herein may modify various elements regardless of order and/or priority, and do not limit the elements. For example, such terms may be used to distinguish one element from another element, such as in "a first user device" and "a second user device", which may indicate different user devices regardless of order or priority. Accordingly, a first element may be referred to as a second element and vice versa.

When a certain element (e.g., a first element) is referred to as being "operatively or communicatively coupled with/to" or "connected to" another element (e.g., a second element), the first element may be coupled to the second element directly or via another element (e.g., a third element). However, when the first element is referred to as being "directly coupled to" or "directly connected to" the second element, there may be no intervening third element therebetween.

The term "configured (or set) to" may be interchangeably used with terms, such as "suitable for", "having the capacity to", "designed to", "adapted to", "made to", and "capable of". The term "configured (or set) to" may not necessarily have the meaning of "specifically designed to". In some cases, "a device configured to" may indicate that the device "may perform" together with other devices or components. For example, "a processor configured (or set) to perform A, B, and C" may represent a dedicated processor (e.g., an embedded processor) for performing a corresponding operation, or a generic-purpose processor (e.g., a central processing unit (CPU) or an application processor) for executing at least one software program stored in a memory device to perform a corresponding operation.

Herein, the term "module" may represent, for example, a unit including one of hardware, software and firmware or a combination thereof. The term "module" may also be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

Examples of an electronic device as described in the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device (e.g., smartglasses, a head-mounted device (HMD), electronic apparel, an electronic bracelet, an electronic necklace, an electronic appcessory, an electronic tattoo, a smart mirror, or a smartwatch).

Other examples of an electronic device may include a smart home appliance, for example, a television (TV), a digital versatile disc (DVD) player, an audio player, a refrigerator, an air conditioner, a cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® or PlayStation®), an electronic dictionary, an electronic key, a camcorder, or an electronic picture frame.

Other examples of an electronic device may also include various medical devices, for example, various portable medical measurement devices (e.g., a blood glucose measuring device, a heart rate measuring device, a blood pressure measuring device, a body temperature measuring device, etc.), a magnetic resonance angiography (MRA) device, a magnetic resonance imaging (MRI) device, a computed tomography (CT) device, a scanner, an ultrasonic device, etc.

Other examples of an electronic device may also include a navigation device, a global positioning system (GPS) receiver, an event data recorder (EDR), a flight data recorder (FDR), a vehicle infotainment device, electronic equipment for vessels (e.g., a navigation system, a gyrocompass, etc.), avionics equipment, a security device, a head unit for a vehicle, an industrial or home robot, an automatic teller machine (ATM), a point of sales (POS) device of a store, or an Internet of Things device (e.g., a bulb, various sensors, an electric or gas meter, a sprinkler, a fire alarm, a thermostat, a streetlamp, a toaster, exercise equipment, a hot water tank, a heater, a boiler, etc.).

Other examples of an electronic device may include at least one of a part of furniture or a building/structure, an electronic board, an electronic signature receiving device, a projector, or a measuring instrument (e.g., a water meter, an electricity meter, a gas meter, a wave meter, or the like).

The electronic device may also be a flexible device.

Additionally, the electronic device may be one or more combinations of the above-mentioned devices.

However, an electronic device, as described herein, is not limited to the above-mentioned example devices, and may include new electronic devices according to the development of technology.

Herein, the term "user" may refer to a person who uses an electronic device or may refer to a device (e.g., an artificial intelligence electronic device) that uses an electronic device.

FIG. 1 illustrates an electronic device in a network environment according to an embodiment of the present disclosure.

Referring to FIG. 1, an electronic device 100 includes a bus 110, a processor 120, a memory 130, an input/output interface 140, a display 150, and a communication interface 160. In various embodiments of the present disclosure, at least one of the foregoing is elements may be omitted or another element may be added to the electronic device 100.

In accordance with an embodiment of the present disclosure, the electronic device 100 performs operations to reduce current consumption during various other operations related to processing of an event. For example, the electronic device 100 performs operations to reduce current consumption during processing of an event related to a message transmitted/received using a communication channel.

The processor 120 includes an application processor 123 and a communication processor 121.

In order to reduce power consumption, the electronic device 100 may process a specified event (e.g., a periodic scheduling event) in the communication processor 121, instead of application processor 123. As a result, periodic scheduling event processing by the application processor 123, which requires higher current consumption than that of the communication processor 121, is minimized, and a sleep state of the application processor 123 is at least partially extended or maintained, so that current consumption for the periodic scheduling event processing may be reduced.

According to an embodiment of the present disclosure, when using the communication processor 121 to process an event, the electronic device 100 may more quickly release a communication channel to a base station device 161, thereby reducing current consumption for maintaining the channel.

According to another embodiment of the present disclosure, the electronic device 100 may delegate a server device 104 (e.g., a mobility management entity (MME)) to perform event processing, so that procedures such as event transmission, response reception, event processing, etc., which are normally performed in the electronic device 100, are no longer or minimally performed by the electronic device 100, thereby reducing current consumption for event processing.

The bus 110 may include a circuit for connecting the above-mentioned elements 110 to 160 to each other and transferring communications (e.g., control messages and/or data) among the above-mentioned elements. For example, the bus 110 may receive a periodic scheduling event (e.g., information, a signal, a message, etc.) from the communication processor 121 and transfer the periodic scheduling event to the communication interface 160. Further, the bus 110 may transfer, to the communication processor 121, a message in response to the periodic scheduling event received by the communication interface 160. The bus 110 may also support data transfer between the application processor 123 and the communication processor 121 in relation to access to the memory 130.

The processor 120 may further include a CPU for supporting operation of the communication processor 121 and the application processor 123. The processor 120 may perform data processing or an operation for communication and/or control of at least one of the other elements of the electronic device 100.

The communication processor 121 may perform a communication operation of the electronic device 100. For example, the communication processor 121 may perform periodic scheduling event processing of the electronic device 100, independently of the application processor 123. The communication processor 121 may be assigned at least a partial area of the memory 130 in relation to signal processing, and may allocate relevant programs to the assigned area of the memory 130. The communication processor 121 may include processing modules (or event processing modules) or programs related to periodic scheduling event processing.

The communication processor 121 may include an event processing module (or processing module) for periodic scheduling event processing in relation to a specific application. The processing module may be allocated to the communication processor 121 (i.e., allocated to an area of the memory 130 assigned in relation to operation of the communication processor 121) during an application installation process. Alternatively, the processing module may be allocated to the communication processor 121 independently of installation of a specific application, and may be associated with an application installed in the application processor 123, based on an application programming interface (API) designed in relation to periodic scheduling event processing.

The communication processor 121 may calculate a common period or an appropriate period of registered periodic scheduling events (e.g., a period determined in consideration of a load (or activation) of the communication processor 121, a period determined through negotiation with a server device, or a period determined by the communication processor 121 corresponding to a specific policy). The communication processor 121 may transfer, to the base station device 161, an integrated message related to periodic scheduling events (e.g., a message for processing periodic scheduling events related to a plurality of applications) at the common period or appropriate period. If the number of types of period scheduling events changes, e.g., due to installation of a new application or uninstallation of an application, the communication processor 121 may recalculate the common period or the appropriate period of changed periodic scheduling events. The communication processor 121 may also control processing of the integrated message corresponding to the recalculated common period or appropriate period.

The communication processor 121 may control an operation related to a quick release of a communication channel (e.g., a radio resource control (RRC) channel release at an earlier time than that specified in a specific regulation) to the base station device 161.

Transmission/reception of a signal related to a periodic scheduling event may be performed differently from other data transmission/reception processing (e.g., maintaining a channel for a specified time after completion of data transmission/reception). For example, a periodic scheduling event may indicate that the electronic device 100 is in an active state in which the electronic device 100 is able to to transmit/receive data, such as a channel maintaining message (e.g., a keep alive message).

As described above, in relation to periodic scheduling event processing, the electronic device 100 and the base station device 161 transmit and receive a message confirming the active state of the electronic device 100, so that a channel for transmitting/receiving data may not be required to be maintained if the electronic device is not confirmed to be in the active state. For periodic scheduling event processing, the communication processor 121 may transfer a specified indicator or a specified message format to the base station device 161 in order to request quick release of a corresponding communication channel.

The communication processor 121 may delegate the server device 104 to perform periodic scheduling event processing. For example, the communication processor 121 may request the server device 104 to confirm whether it is able to perform message transmission/reception related to a periodic scheduling event. When the server device 104 supports the corresponding function, the communication processor 121 may delegate the server device 104 to perform periodic scheduling event processing, and receive a confirmation message related to periodic scheduling event processing from the server device 104. In response to the confirmation message from the server device 104, the communication processor 121 may intermittently transmit an acknowledgement (ACK) signal to the server device 104. Alternatively, the communication processor 121 may not transmit the acknowledgement signal to the server device 104 for a specified period of time.

The application processor 123 may perform signal processing related to processing of various user functions of the electronic device 100. The application processor 123 may include at least one application related to the above-mentioned various user functions. The application processor 123 may be assigned an area of the memory 130 related to user function operation, and may support installation or loading of an application related to the user function operation in the area of the memory 130. Accordingly, the application processor 123 may include an application related to processing of at least one user function.

At least one of applications allocated to the application processor 123 may require periodic scheduling event processing. Therefore, the application processor 123 may provide, to the communication processor 121, information related to an application for which periodic scheduling event processing is required. If a new application is installed, for which periodic scheduling event processing is required, the application processor 123 may provide application-related information to the communication processor 121. Further, if an application for which periodic scheduling event processing is required is uninstalled, the application processor 123 may request the communication processor 121 to delete relevant information regarding the uninstalled application.

The application processor 123 may include an interface for the above-mentioned periodic scheduling event processing, and may transfer the application-related information.

In response to a request from the communication processor 121, the application processor 123 may be in a wake-up state (or an active state) in order to receive a specific message (e.g., a push message) from the communication processor 121. If the application processor 123 is in the active state, the application processor 123 may perform the above-described periodic scheduling event processing itself. Accordingly, the application processor 123 may request accumulated information related to the periodic scheduling event processing from the communication processor 121, and may then control a data update of a corresponding application.

The memory device 130 may include a volatile memory and/or a nonvolatile memory, and may store an instruction or data related to at least one of the other elements of the electronic device 100.

The memory 130 may allocate a communication processor area related to allocation of a program (or a processing module) for operating the communication processor 121 and an application processor area related to allocation of a program (or a processing module) for operating the application processor 123. Applications related to at least one user function may be allocated to the application processor area. A common processing module or an individual processing module related to periodic scheduling event processing, or a sub application (e.g., a light version program which supports a reduced or limited function compared to a full version program) provided for periodic scheduling event processing for each application (e.g., a full version program) allocated to the application processor area may be allocated to the communication processor area.

The input/output interface 140 may transfer an instruction or data input from a user or another external device to (an)other element(s) of the electronic device 100. Further, the input/output interface 140 may output an instruction or data received from (an)other element(s) of the electronic device 100 to the user or another external device. The input/output interface 140 may generate an input event related to installation of a new application or an input event related to uninstallation of an application corresponding to control input by the user. Further, the input/output interface 140 may generate an input event related to sleep switching of the application processor 123 or an input event related to a request for activation of the application processor 123 corresponding to control input by the user.

The display 150 may include, for example, a liquid crystal display (LCD), a light-emitting diode (LED) display, an organic light-emitting diode (OLED) display, a microelectromechanical systems (MEMS) display, and/or an electronic paper display. The display 150 may display various content (e.g., a text, an image, a video, an icon, a symbol, etc.). The display 150 may also include a touchscreen that receives a touch input, a gesture input, a proximity input, and/or a hovering input by an electronic pen or a part of a body of the user.

The display 150 may have a screen state (e.g., a turn-off state) corresponding to a sleep state of the application processor 123 and a screen state (e.g., a turn-on state or a state in which a home screen, a standby screen, or a specific application operation screen is output) corresponding to an active state of the application processor 123.

The display 150 may output specified information corresponding to control by the communication processor 121, while the application processor 123 is in the sleep state. For example, the display 150 may output information related to periodic scheduling event processing (e.g., information on transmission of a specified message or reception of ACK of the message), guidance information about deputing the server device 104 to perform periodic scheduling event processing, etc., corresponding to control by the communication processor 121.

The display 150 may output information on at least one of a current operation state or the types of applications related to periodic scheduling event processing corresponding to control by the communication processor 121 (or control by the application processor 123). The display 150 may also output information received from the server device 104 or another electronic device in relation to a specific application corresponding to control by the communication processor 121.

The communication interface 160 may set communications between the electronic device 100 and another electronic device 102, the base station device 161, a wireless access point 106, and/or the server device 104. For example, the communication interface 160 may be wirelessly connected (or by wire) to a network 162 including the base station device 161 in order to communicate with the electronic device 102 or the server device 104.

The communication interface 160 may be connected to the network 162 including the base station device 161 corresponding to control by the communication processor 121. For example, the communication interface 160 may establish a specific communication channel (e.g., an RRC channel) to the base station device 161 corresponding to control by the communication processor 121. According to control by the communication processor 121, the communication interface 160 may transmit a message related to a periodic scheduling event to the server device 104, or may receive a message related to a periodic scheduling event from the server device 104 and may transfer the message to the communication processor 121.

The communication interface 160 may communicate with the other electronic device 102 or the server device 104 connected to the network 162 via the wireless access point 106 that supports short-range wireless communication, corresponding to control by the application processor 123. Accordingly, the communication interface 160 may also transmit a message related to periodic scheduling event processing to the server device 104 via the wireless access point 106, corresponding to control by the application processor 123.

For example, at least one cellular communication protocol such as long-term evolution (LTE), LTE-Advanced (LTE-A), code-division multiple access (CDMA), wideband CDMA (WCDMA), universal mobile telecommunications system (UMTS), wireless broadband (WiBro), global system for mobile communications (GSM), etc., may be used for the wireless communication performed corresponding to control by the communication processor 121.

A technology for the wired communication may include at least one of universal serial bus (USB), high definition multimedia interface (HDMI), recommended standard 232 (RS-232), or plain old telephone service (POTS).

Short-range wireless communication performed corresponding to control by the application processor 123 may be performed using a communication method based on a Bluetooth® communication module, a Wi-Fi® direct communication module, etc.

The network 162 may include at least one of telecommunications networks, for example, a computer network (e.g., a local area network (LAN) or a wide area network (WAN)), the Internet, or a telephone network.

The network 162 includes the base station device 161, which may establish a wireless communication channel to the electronic device 100. Specifically, the base station device 161 may establish or release a wireless communication channel corresponding to control by the server device 104.

The base station device 161 may establish an RRC channel to the electronic device 100 in relation to periodic scheduling event processing. Further, the base station device 161 may release the RRC channel corresponding to control by the server device 104 (e.g., at a relatively earlier time compared to that of a set regulation).

The type of the other electronic device 102 may be the same as or different from that of the electronic device 100.

The external electronic device 102 may transmit a call connection request message to the electronic device 100 or may request message transmission therefrom, via the network 162.

The server device 104 may include a group of one or more servers.

According to an embodiment of the present disclosure, a portion or all of operations performed in the electronic device 100 may be performed in one or more other electronic devices (e.g., the electronic device 102 or the server device 104).

When the electronic device 100 should perform a certain function or service, the electronic device 100 may request at least a portion of functions related to the function or service from the electronic device 102 or the server device 104, instead of or in addition to performing the function or service for itself. The other electronic device 102 or the server device 104 may perform the requested function or additional function, and may transfer a result of performance to the electronic device 100. The electronic device 100 may intactly use or additionally process the received result to provide the requested function or service. For example, a cloud computing technology, a distributed computing technology, or a client-server computing technology may be used by the electronic device 100 and the other electronic device 102 or the server device 104.

Figure 2:
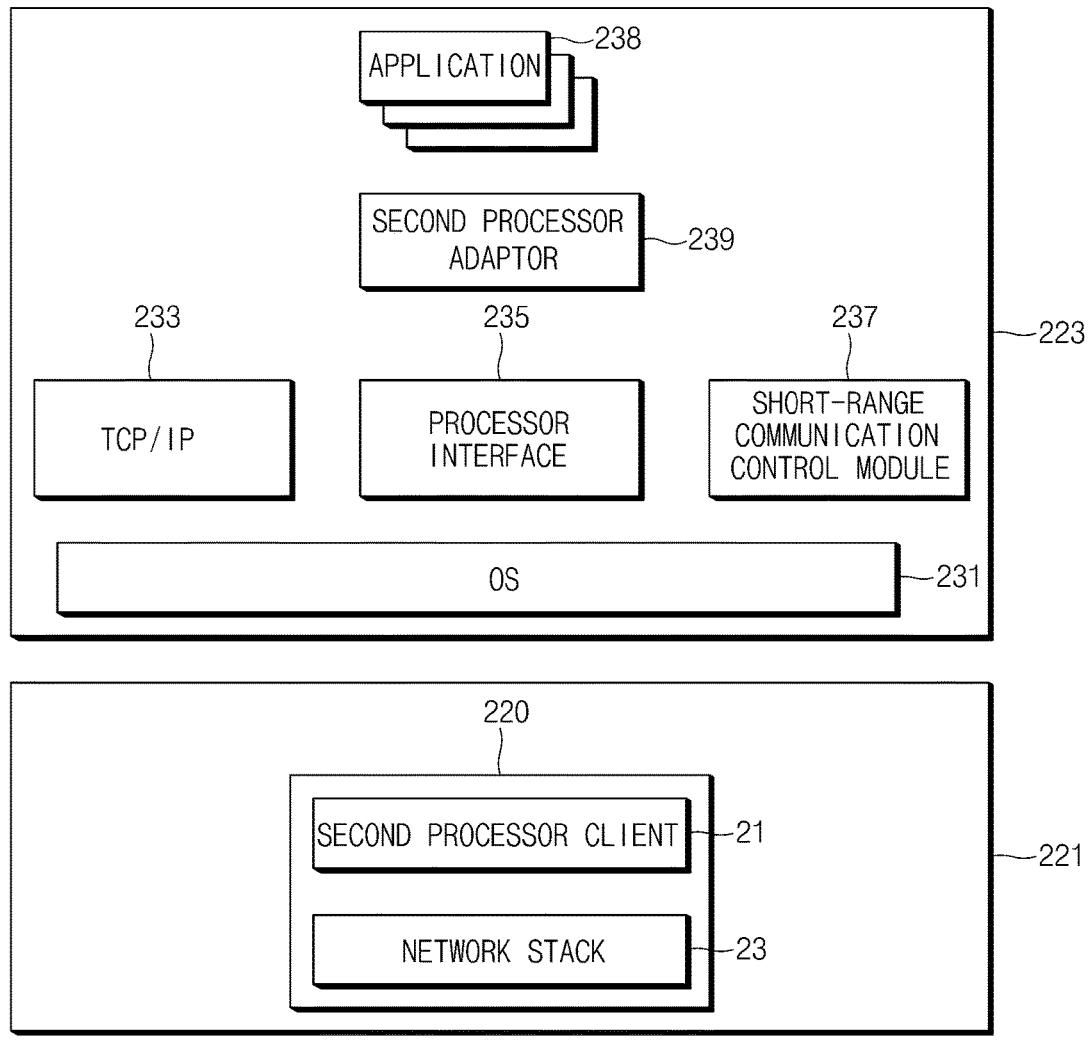
FIG. 2 illustrates a processor of an electronic device according to an embodiment of the present disclosure.

FIG. 2 illustrates a processor of an electronic device according to an embodiment of the present disclosure. For example, an application processor 223 and a communication processor 221 as illustrated in FIG. 2 may be used as the application processor 123 and the communication processor 121 in the electronic device 100 illustrated in FIG. 1 Referring to FIG. 2, the application processor 223 includes an application 238, a second processor adaptor 239, a transmission control protocol/Internet protocol (TCP/IP) module 233, a processor interface 235, a short-range communication control module 237, and an operating system (OS) 231.

The application 238 may include at least one program related to at least one user function. For example, the application 238 may include a document editing program, a photo program, a memorandum program, a messaging program, a chatting program, an electronic mail program, an updating program, a game program, a clouding program, a call program, etc., for which aperiodic or periodic scheduling event processing is required. Further, the application 238 may include an information providing program for providing corresponding information corresponding to whether specific information (e.g., a secured network service (SNS), weather, stock, real estate, finance, paper, music, movie, traffic, transportation, etc.) is updated or uploaded.

Periodic scheduling event processing for the application 238 may be performed corresponding to operation of the communication processor 221.

The second processor adaptor 239 may control periodic scheduling event processing for the application 238. For example, if the application 238 for which periodic scheduling event processing is required is newly installed, the second processor adaptor 239 may provide information on the application 238 to the communication processor 221 to request event processing. Alternatively, the second processor adaptor 239 may check an application for which periodic scheduling event processing is required among applications being executed, and may request the communication processor 221 to perform periodic scheduling event processing for the application. If the application 238 is deleted, the second processor adaptor 239 may provide deletion-related information to the communication processor 221. The second processor adaptor 239 may communicate with a second processor client 21 via the processor interface 235 in relation to periodic scheduling event processing.

The TCP/IP module 233 may support packet processing for communication of the electronic device. For example, the TCP/IP module 233 may control distribution of packets for operating the application 238 and input or transfer addresses of packets generated by the application 238. When the application processor 223 is activated, the TCP/IP module 233 may perform packetizing of data for operating the application 238 and may support transfer of the corresponding packets by the communication processor 221. The TCP/IP module 233 may be in a sleep state when the application processor 223 is inactive (e.g., in a sleep mode state). The TCP/IP module 233 may support establishment of a communication channel to a server device via a base station device using the communication processor 221.

The processor interface 235 may support data transmission/reception between the second processor adaptor 239 of the application processor 223 and the second processor client 21 of the communication processor 221. For example, if periodic scheduling event processing is requested, the processor interface 235 requests a corresponding API from the OS 231, and may transmit data of the second processor adaptor 239 (e.g., information on the application 238 related to periodic scheduling event processing) to the second processor client 21 based on the API provided by the OS 231. The processor interface 235 may include a software module such as a multiplexer, a telephony framework, a modem interface, etc.

Alternatively, the processor interface 235 may include a hardware module such as a shared memory, a serial bus, a USB, a high speed inter chip or high speed interconnection (HSIC), a low latency interface (LLI), etc.

Information transmitted/received through the processor interface 235 may include a unique value for identifying an application such as an application globally unique identifier (GUID) or a service identifier (ID), or a unique value for differentiating devices, such as an international mobile station equipment identity (IMEI) or another unique ID.

Further, for a keep alive function, the processor interface 235 may transfer keep alive registration information including at least one of a source IP/port, a target server address or IP/port, an application ID, an account ID/password (PW), a keep alive sync period min/max/interval, timeout (waiting time after pinging), format, or encoding/decoding information, from the application processor 223 to the communication processor 221.

The processor interface 235 may transfer, to the communication processor 221, a signal of operation control (e.g., pause, resume, etc.) of the second processor client 21 corresponding to control by the application processor 223. The processor interface 235 may transfer, from the communication processor 221 to the application processor 223, a return value (including an error) indicating success or failure of the communication processor 221 corresponding to a control or a setting of the application processor 223 and an incoming push message from a network.

Further, the processor interface 235 may transfer, to the communication processor 221, at least one of sleep state information or wake-up state information of the application processor 223 or information on a state in which the network is accessible through another communication device (e.g., a Bluetooth® module, a Wi-Fi® module, etc.) connected to the application processor 223.

When the application processor 223 is included in a wearable electronic device, information on a companion state (e.g., a state of connection through a short-range communication module while being located within a certain distance from a companion electronic device) or a stand-alone state (e.g., a state of communication connection through a cellular communication module while being spaced apart from a companion electronic device by a certain distance) may be transferred to the communication processor 221. Further, the processor interface 235 may transfer address list information managed by the application processor 223 to the communication processor 221. The communication processor 221 may output address list information related to a received message based on the received address list information.

The short-range communication control module 237 may control at least one short-range communication module included in a communication interface of the electronic device.

An the electronic device may be configured to preferentially use a free or relatively low-cost additional network (e.g., a network of which cost is lower than that for a communication service provided using a base station device, such as a specified public Wi-Fi network or a specified private network) corresponding to a setting.

The short-range communication control module 237 may perform a periphery search at a certain period or in real time, and if the additional network is discovered (e.g., if an access point (AP) related to the additional network is discovered), the short-range communication control module 237 may control access to a server device through a relevant communication module (e.g., a Wi-Fi® communication module or a Bluetooth® communication module).

The short-range communication control module 237 may be operated in real time or intermittently (e.g., aperiodically or at a specified period) while the application processor 223 is active. Alternatively, the short-range communication control module 237 may be operated intermittently while the application processor 223 is inactive. The short-range communication control module 237 may receive a periodic scheduling event from the second processor adaptor 239, and may transmit a message related to the event to a server device through an additional network.

The OS 231 may include a kernel, middleware, an API, etc.

The kernel may control or manage system resources (e.g., a bus, a processor, memory, etc.) used to perform operations or functions of other programs (e.g., middleware, an API, an application program, etc.). Further, the kernel may provide an interface for the middleware, the API, or the application 238 to access individual elements of the electronic device in order to control or manage the system resources.

The middleware may serve as an intermediary between the API or the application 238 and the kernel in order for the API or the application 238 to communicate and exchange data with the kernel. Further, the middleware may perform a control operation (e.g., scheduling or load balancing) with respect to operation requests received from the application 238 by using, e.g., a method of assigning a priority for using system resources (e.g., the bus, the processor, the memory, etc.) of the electronic device to at least one application.

The API, which is an interface for the application to control a function provided by the kernel or the middleware, may include at least one interface or function (e.g., an instruction) for, for example, file control, window control, image processing, or character control. The API may include an API for transferring data of the second processor adaptor 239 of the application processor 223 and the second processor client 21 of the communication processor 221. Further, the API may include an API for temporarily storing new data generated in relation to processing of data of the second processor client 21 and updating data temporarily stored in the relevant application 238, when the application processor 223 is activated.

According to an embodiment of the present disclosure, an API related to keep alive registration may be implemented as shown in Table 1 below.

TABLE 1

| Return Value | API name |
|---|---|
| Registration ID | int startHeartBeat(String serverIp, int port, int min, int max, int timeout, Callback callback)<br>    serverIp;<br>    port;<br>    min;<br>    max;<br>    timeout;<br>    callback;<br>        // Object to be passed as argument when calling CallBack function<br>        class CpHeartBeatEvent{<br>        int eventType;// 1 : connection close, 2 : timeout<br>    String reason;// ex) connection reset by peer, socket timeout, etc.} |

In Table 1, serverIp: indicates a target server address, port indicates a: target server port, min indicates a: default KeepAlive transmission period, max indicates a: maximum KeepAlive transmission period (e.g., a period is increased by 4 minutes for every success from min up to max), timeout indicates a: waiting time until response after KeepAlive transmission, and callback indicates a: callback function to be called in the case of corresponding connection close or at the time of occurrence of timeout.

TABLE 2

| Return value | API name |
|---|---|
| Success/fail(error code) | boolean stopHeartBeat(int id) |

TABLE 3

| Return value | API name |
|---|---|
| Success/fail(error code) | boolean sendHeartBeat(String serverIp, int port, int timeOut, Callback callback)<br>    serverIp;<br>    port;<br>    timeout;<br>    callback;<br>        // Object to be passed as argument when calling CallBack function<br>        class CpHeartBeatEvent{<br>        int eventType;// 1 : connection close, 2 : timeout<br>        String reason;// ex) connection reset by peer, socket timeout, etc.} |

Table 2 is for release of KeepAlive registered on the CP. Table 3 is for transmitting Ping to a server immediately.

In Table 3, serverIp indicates a target server address, port indicates a target server port, timeout indicates a waiting time until response after KeepAlive transmission, and callback indicates a callback function to be called in the case of corresponding connection close or at the time of occurrence of timeout.

The above-described API related to keep alive is an example of an API implemented in the second processor adaptor 239 and may be variously modified or adjusted.

The communication processor 221 includes a processing module 220 including the second processor client 21 and a network stack 23. The second processor client 21 may receive information related to the application 238 from the second processor adaptor 239 via the processor interface 235. The second processor client 21 may transfer, to the network stack 23, a message related to periodic scheduling event processing in the received information related to the application 238. The second processor client 21 may control, for example, data download or upload or a background sync operation related to processing the application 238. The second processor client 21 may store, in a memory (e.g., a memory area allocated for operating the communication processor 221), at least a part of data obtained during periodic scheduling event processing.

If the application processor 223 is activated, the second processor client 21 may transfer the stored information to the application processor 223 in order to support a data update of the application 238.

The second processor adaptor 21 may process an ACK received in relation to periodic scheduling event processing (e.g., keep alive message processing). Further, upon receiving a push message from a server device, the second processor client 21 may transfer the push message to the application processor 223. The second processor client 21 may activate the application processor s23 in a sleep mode state, and may transfer the push message, information on the application 238 related to the push message, etc., to the application processor 223.

The second processor client 21 may output the received push message to a display.

If an electronic device is designed such that a plurality of displays are included therein and a specific display is controlled by the communication processor 221, the second processor client 21 may output the push message to a display allocated in relation to the communication processor 221.

The second processor client 21 may also decode a received IP packet and transfer data to the relevant application 238.

The network stack 23 may transfer a message received from the second processor client 21 to a server device at a certain period. If a plurality of transfer messages exist, the network stack 23 may check transmission periods of the messages, and calculate a common period, an integrated period, or an appropriate period. The network stack 23 may transmit a message related to period scheduling event processing corresponding to the calculated period.

The second processor client 21 and the network stack 23 may be arranged in the processor 221 as a common processing module (e.g., the processing module 20). Alternatively, the second processor client 21 and the network stack 23 may be arranged as separate modules (e.g., a plurality of processing modules) corresponding to respective applications 238, in the communication processor 221.

A light-version application including the second processor client 21 and the network stack 23 may also be included in the communication processor 221.

Figure 3:
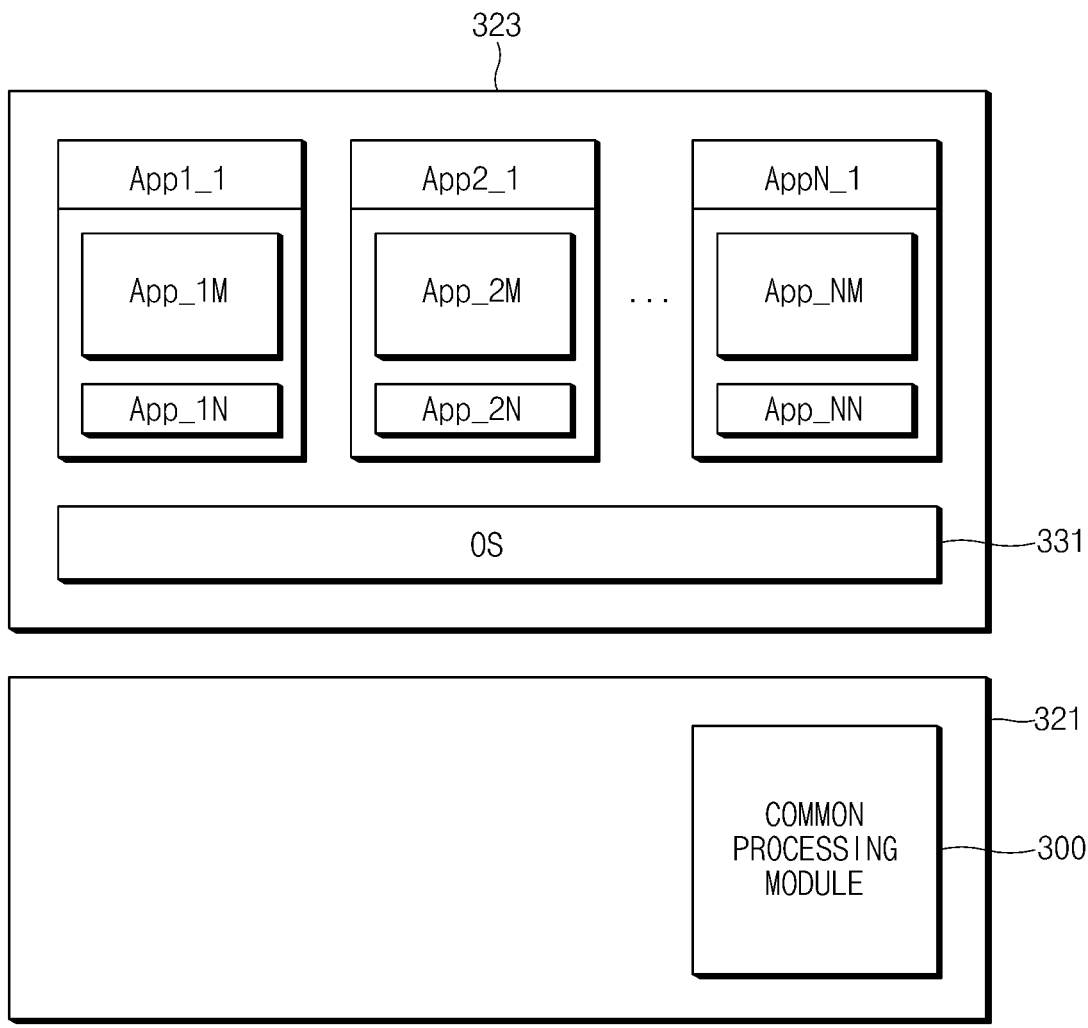
FIG. 3 illustrates a processor having a common processing module according to an embodiment of the present disclosure.

FIG. 3 illustrates a processor having a common processing module according to an embodiment of the present disclosure. For example, an application processor 323 and a communication processor 321 as illustrated in FIG. 3 may be used as the application processor 123 and the communication processor 121 in the electronic device 100 illustrated in FIG. 1.

Referring to FIG. 3, the application processor 323 includes a plurality of applications (application App1_1, an application App2_1, . . . an application AppN_1) and an OS 331. The applications App1_1, App2_1, and AppN_1 may support a periodic scheduling event processing function. For example, the applications App1_1, App2_1, and AppN_1 may be a calling application, a messaging application, a chatting application, an SNS application, etc.

Application App1_1 includes a module App_1M related to performance of a specific user function and a module App_1N related to periodic scheduling event processing. Similarly, application App2_1 includes a module App_2M related to performance of a specific user function and a module App_2N related to periodic scheduling event processing, and application AppN_1 includes a module App_NM for supporting a specific user function and a module App_NN related to periodic scheduling event processing. At least one of the modules App_1N, App_2N, and App_NN may provide application-related information to a common processing module 300 of the communication processor 321.

The common processing module 300 of the communication processor 321 may receive information related to periodic scheduling event processing of a specified application from at least one of the modules App_1N, App_2N, and App_NN arranged in the application processor 323. For example, the common processing module 300 may receive, from the module App_1N, type information of the application App1_1, address information of a server device to be accessed, information of a message to be transmitted, transmission period information, etc.

Upon receiving application-related information from the modules App_1N, App_2N, and App_NN, the common processing module 300 may check period information of each received information to calculate a common period, an integrated period, or an appropriate period. The common processing module 300 may control transmission of a message related to periodic scheduling event processing at the calculated period.

Figure 4:
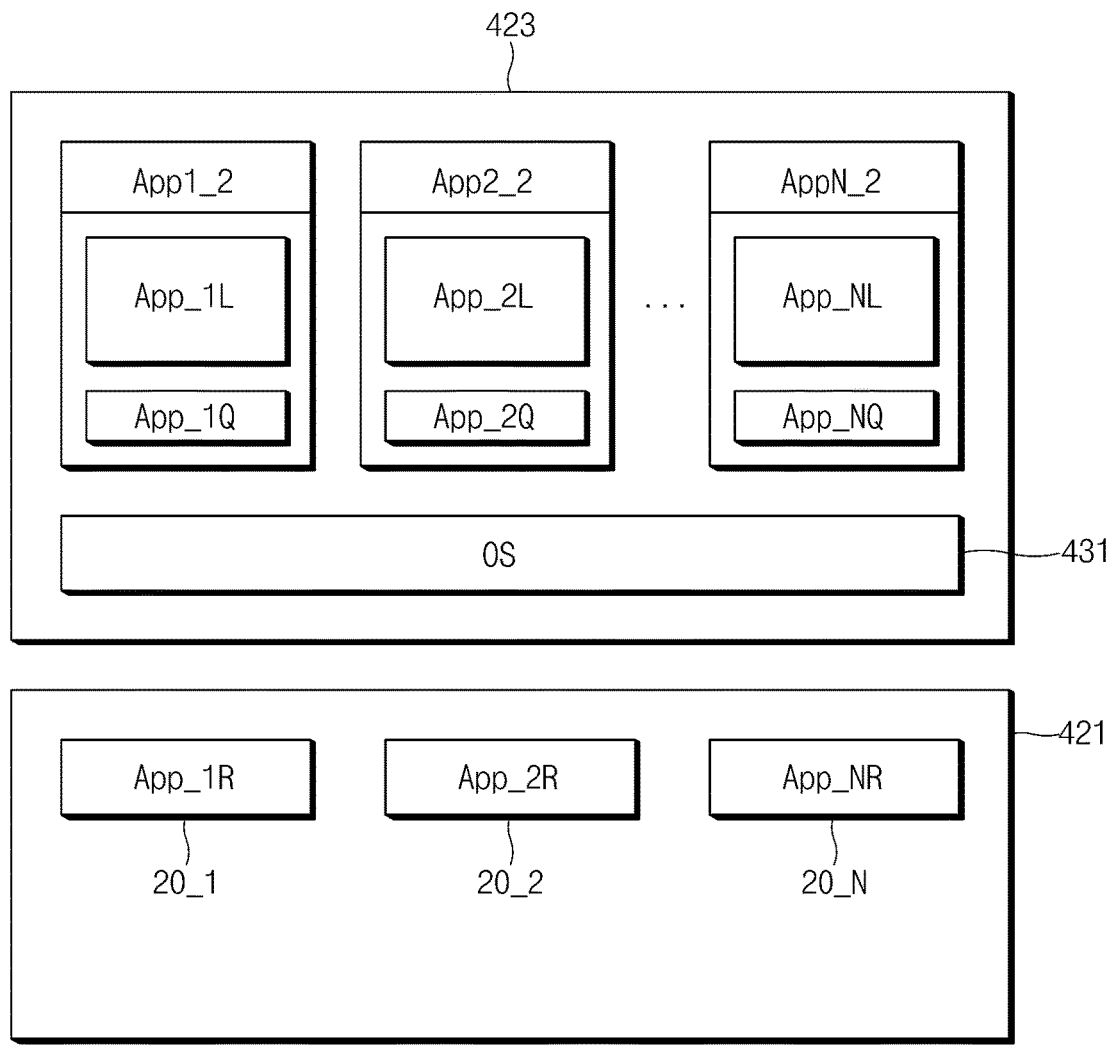
FIG. 4 illustrates a processor having an individual processing module according to an embodiment of the present disclosure.

FIG. 4 illustrates a processor having an individual processing module according to an embodiment of the present disclosure. For example, an application processor 423 and a communication processor 421 as illustrated in FIG. 4 may be used as the application processor 123 and the communication processor 121 in the electronic device 100 illustrated in FIG. 1.

Referring to FIG. 4, the application processor 423 includes a plurality of applications (an application App1_2, an application App2_2, ... an application AppN_2), and an OS 431. The applications App1_2, App2_2, and AppN_2 may support a periodic scheduling event processing function in relation to support for a specific user function. For example, the applications App1_2, App2_2, and AppN_2 may include a calling application, a messaging application, a chatting application, an SNS application, etc. The applications App1_2, App2_2, and AppN_2 may also be various types of game applications.

The applications App1_2, App2_2, and AppN_2 include modules App_1L, App_2L, and App_NL, respectively, which are related to operation of a game function for each type. Further, the applications App1_2, App2_2, and AppN_2 include modules App_1Q, App_2Q, and App_NQ, respectively, which are related to periodic scheduling event processing.

For periodic scheduling event processing of the applications App1_2, App2_2, and AppN_2, the communication processor 421 includes an App_1R module 20_1, an App_2R module 20_2, and an App_NR module 20_N. Each of the App_1R module 20_1, the App_2R module 20_2, and the App_NR module 20_N of the communication processor 421 may include a second processor client and a network stack, similar to the second processor client 21 and the network stack 23 of the processing module 220 illustrated in FIG. 2, or a common processing module, similar to the common processing module 300 illustrated in FIG. 3.

The App_1R module 20_1 may communicate with the module App_1Q allocated to the application App1_2 through a specific API or a processor interface. For example, the App_1R module 20_1 may receive, from the module App_1Q, application-related information related to periodic scheduling event processing of the application App1_2. According to the received application-related information, the App_1R module 20_1 may control transmission of a message related to periodic scheduling event processing. Similarly, the App_2R module 20_2 may receive application-related information from the module App_2Q of the application App2_2, and the App_NR module 20_N may receive application-related information from the module App_NQ of the application AppN_2. The App_1R module 20_1, the App_2R module 20_2, and the App_NR module 20_N may control transmission of a relevant message corresponding to a transmission period specified in the application-related information.

The communication processor 421 may control data transmission periods of the network stacks of the App_1R module 20_1, the App_2R module 20_2, and the App_NR module 20_N so that relevant messages are transmitted at one period.

Figure 5:
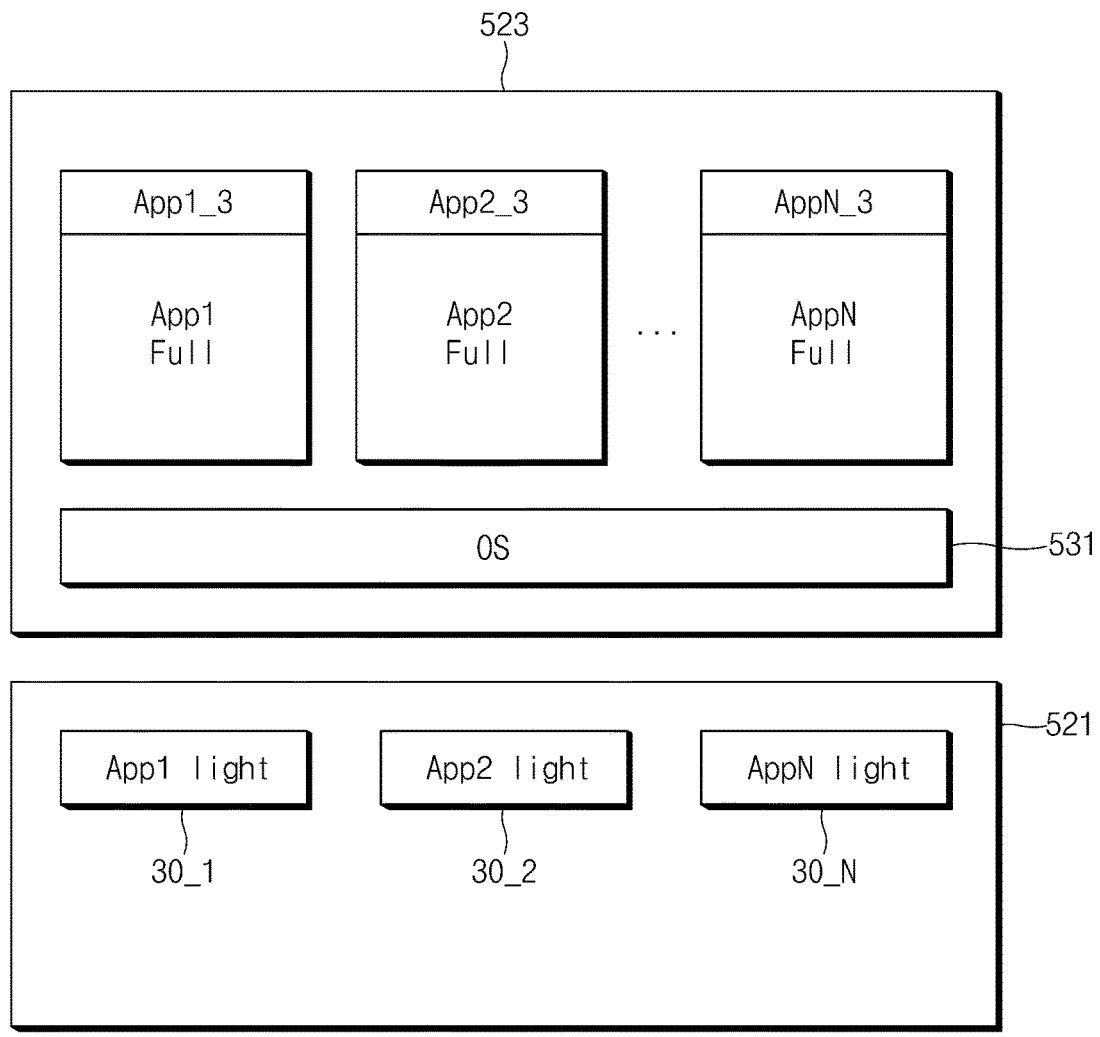
FIG. 5 illustrates a processor having a light-version application according to an embodiment of the present disclosure.

FIG. 5 illustrates a processor having a light-version application according to an embodiment of the present disclosure. For example, an application processor 523 and a communication processor 521 as illustrated in FIG. 5 may be used as the application processor 123 and the communication processor 121 in the electronic device 100 illustrated in FIG. 1.

Referring to FIG. 5, the application processor 523 includes a plurality of applications (an application App1_3, an application App2_3, ... an application AppN_3), and an OS 531. The applications App1_3, App2_3, and AppN_3 may be full-version programs related to support for specific user functions and/or may be applications for which periodic scheduling event processing is required. The applications App1_3, App2_3, and AppN_3 may perform periodic scheduling event processing corresponding to control by the application processor 523, while the application processor 523 is active. However, the applications App1_3, App2_3, and AppN_3 may not perform periodic scheduling event processing, if the application processor 523 is in a sleep state.

The communication processor 521 includes an App1 light 30_1, an App2 light 30_2, and AppN light 30_N, which are installed based on light-version programs related to the applications App1_3, App2_3, and AppN_3. For example, the App1 light 30_1 may be a program related to periodic scheduling event processing related to the application App1_3. Similarly, the App2 light 30_2 may be a program related to periodic scheduling event processing related to the application App2_3 and the AppN light 30_N may be a program related to periodic scheduling event processing related to the application AppN_N3.

The App1 light 30_1, App2 light 30_2, and AppN light 30_N may be installed independently of the applications App1_3, App2_3, and AppN_3.

If the application App1_3 is installed, the application processor 523 may output guidance information about installation of the App1 light 30_1 related to the application App1_3 or may output link information (e.g., address information for access to a server that provides a relevant program) about installation of the corresponding application. The application processor 523 may output a current consumption reduction guidance message corresponding to operation of the App1 light 30_1.

Update information related to the applications App1_3, App2_3, and AppN_3 and update information related to the App1 light 30_1, the App2 light 30_2, and the AppN light 30_N may be updated individually. For an application for which a light-version program is not installed in the communication processor 521, a periodic scheduling event may be processed by the application processor 523.

While a light-version program is installed, the communication processor 521 may register a relevant application, and if the application processor 523 enters a sleep mode, the communication processor 521 may activate the installed light-version program in order to control periodic scheduling event processing.

An electronic device may include an information exchange API (e.g., inter-application information exchange API) to be exchanged between a full-version application (e.g., App1_3, App2_3, or AppN_3) and a light-version application (e.g., App1 light, App2 light, or AppN light). The full-version application may perform overall integrated handling of the application based on the information exchange API, and may transmit/receive information related to execution of a function to/from the light-version application. The full-version application may transfer, based on the information exchange API, various status update information of the full-version application and information on recent heartbeat (or keepAlive) transmission performed based on the full-version application to the light-version application.

The light-version application may provide, to the full-version application, status update information of the light-version application and information on recent heartbeat transmission performed based on the light-version application. For example, if the application processor 523 is in a sleep state, messages received by the communication processor 521 (e.g., messages related to execution of the light-version application) may be integrated with the full-version application through the information exchange API.

The full-version application may be, for example, a real-time messaging application, a messaging application, a game application, an SNS application, etc. The light-version application may be a light-version real-time messaging application, a light-version messaging application, a light-version game application, or a light-version SNS application. The light-version application may also include a program routine to be performed based on the communication processor 521 among program routines (or one or more codes, one or more functions, etc.) included in the full-version application.

Figure 6:
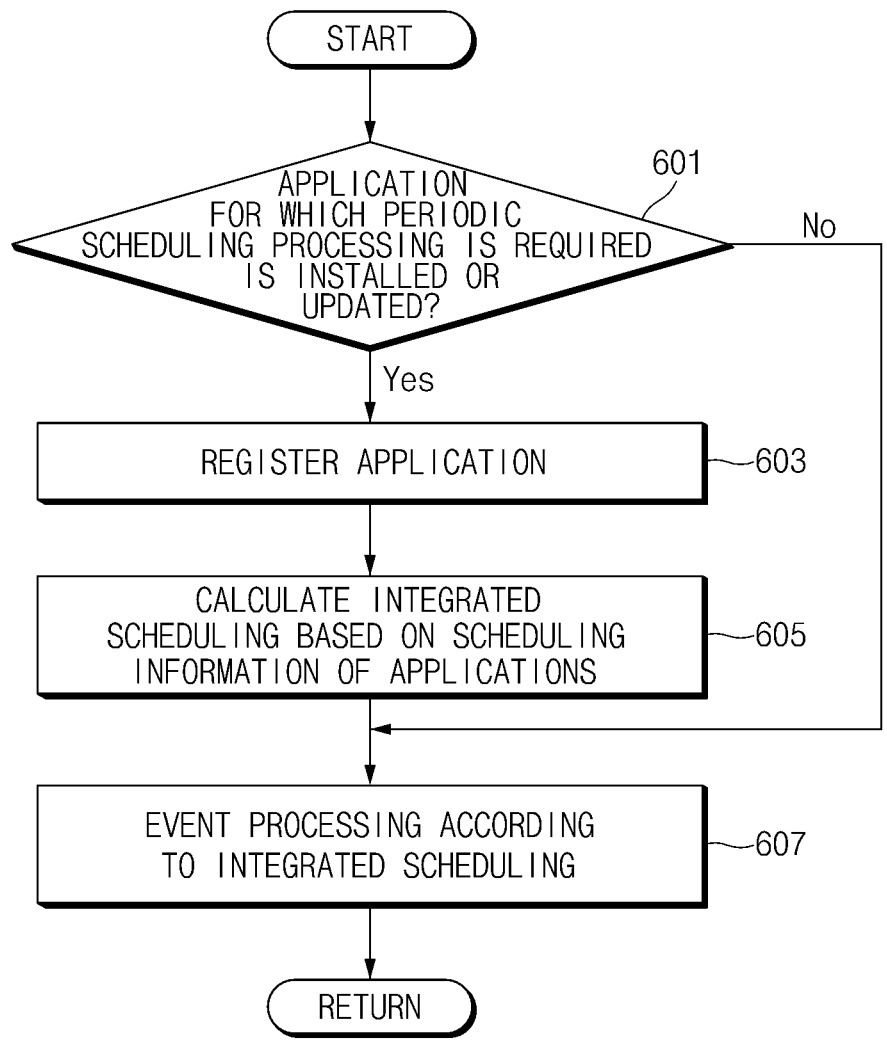
FIG. 6 is a flowchart illustrating a method for reducing current consumption during event processing according to an embodiment of the present disclosure.

FIG. 6 is a flowchart illustrating a method for reducing current consumption during event processing according to an embodiment of the present disclosure.

Referring to FIG. 6, in step 601, an application processor determines whether an application for which periodic scheduling event processing is required is installed or updated. The application for which periodic scheduling event processing is required may be an application including at least one program routine for transmitting/receiving a message to/from a base station device or a server device. As described above, the periodic scheduling event processing may include keep alive message processing, periodic ping message processing, etc. The program routine may be included in the application corresponding to the type or attribute of the application, and may be defined in application information. Application-related information may be allocated to a location recognizable by the application processor (e.g., a specified header location).

If an application for which periodic scheduling event processing is required is installed or updated, the application processor performs application registration in step 603. For example, the application processor collects application-related information (e.g., type information of an application, address information of a target server device, port information of a target server device, a transmission period, etc.). The application processor may transfer the collected application-related information to a communication processor and request the communication processor to register the application-related information in a relevant module. In response to the request from the application processor, the communication processor may register specific application-related information in relation to periodic scheduling event processing.

In step 605, the communication processor performs integrated scheduling calculation based on scheduling information of applications. For example, the communication processor may check pieces of transmission period information in a plurality of pieces of application-related information. The communication processor may calculate a common period or an appropriate period based on the pieces of transmission period information. The communication processor may determine the calculated common period or appropriate period as an integrated scheduling criterion. Thereafter, the communication processor may extract information on a maximum transmission period and a default transmission period from the application-related information, and calculate a common interval of a plurality of transmission periods. The communication processor may determine at least one time point or range in the common interval as the common period or appropriate period.

After calculating the integrated scheduling or when an application for which periodic scheduling event processing is required is not installed or updated, in step 607, the communication processor controls event processing corresponding to the integrated scheduling. For example, if the calculated common period or appropriate period time point arrives, the communication processor transmits a message related to periodic scheduling events to a server device. Accordingly, the communication processor may support periodic scheduling event processing corresponding to a previous common period or appropriate period, until a common period or appropriate period is changed due to installation of a new application in step 601.

Figure 7:
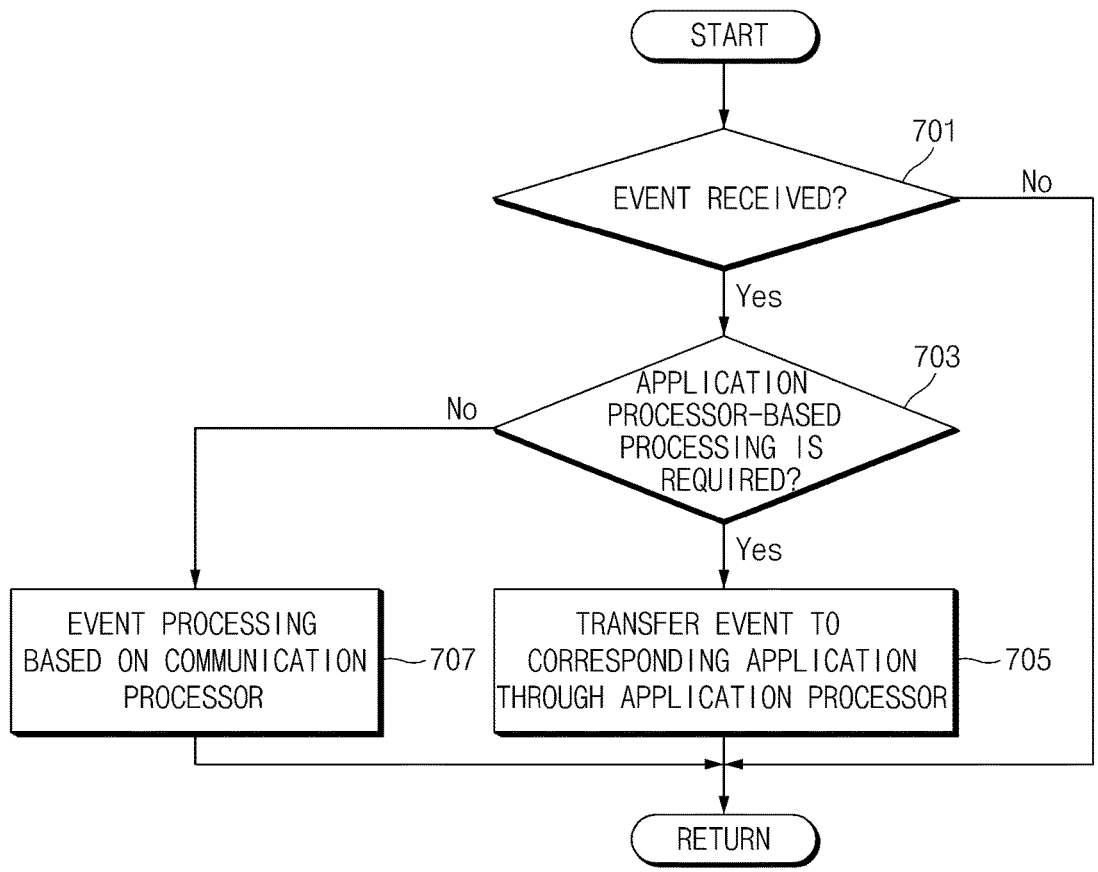
FIG. 7 is a flowchart illustrating a method for reducing current consumption during an inter-processor event according to an embodiment of the present disclosure.

FIG. 7 is a flowchart illustrating a method for reducing current consumption during an inter-processor event according to an embodiment of the present disclosure.

Referring to FIG. 7, in step 701, a communication processor determines whether an event is received. For example, an application processor of an electronic device may be in a sleep state and the communication processor may be in a wake-up state in relation to periodic scheduling event processing. Further, the communication processor may be able to receive a push message provided by a server device.

If an event is not received in step 701, the communication processor may skip the following steps and operate in a standby state. Alternatively, the communication processor may wait for the arrival of a period related to scheduling event processing based on a common period or a specific period.

If the event is received in step 701, the communication processor determines whether processing by the application processor is required to process the received event in step 703. For example, the communication processor may determine whether the received event has been requested to be transferred to an application based on the application processor.

If processing by the application processor is required in step 703, the communication processor transfers the event to a corresponding application through the application processor in step 705. Accordingly, the communication processor may activate the application processor from a sleep state and transfer the event to the application processor. The application processor may then check the type of the received event to search for a relevant application, and transfer the event to an application that will process the event.

If processing by the application processor is not required for the received event in step 703, the communication processor controls event processing in step 707. For example, the communication processor may output a specified screen corresponding to the received event on a display.

Alternatively, the communication processor may transfer a response signal ACK to a server device after checking the received event.

After performing an event processing operation, the communication processor may enter a standby state to receive another event.

Figure 8:
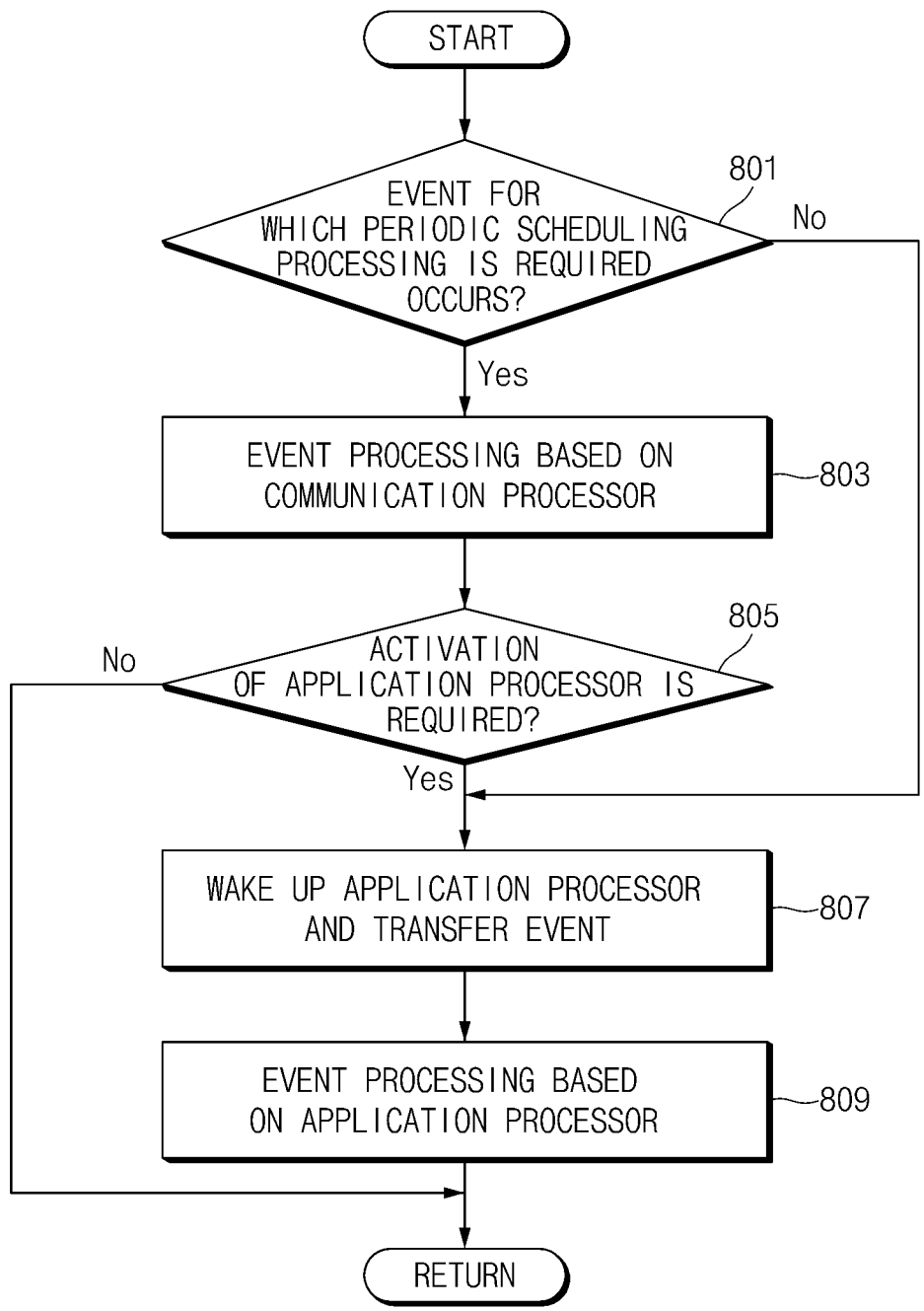
FIG. 8 is a flowchart illustrating a method for reducing current consumption based on periodic scheduling according to an embodiment of the present disclosure.

FIG. 8 is a flowchart illustrating a method for reducing current consumption based on periodic scheduling processing according to an embodiment of the present disclosure.

Referring to FIG. 8, in step 801, an electronic device determines whether an event for which periodic scheduling processing is required occurs. For example, an application processor of the electronic device may determine whether an event for which periodic scheduling processing is required occurs in relation to a specific application.

If an event for which periodic scheduling processing is required occurs in step 801, the application processor requests a communication processor to process the event in step 803. The application processor may enter a sleep state independently of the communication processor corresponding to whether an event to be performed exists, after requesting periodic scheduling processing. For example, an event for which periodic scheduling processing is required may occur due to application-related information pre-registered in the communication processor. That is, the communication processor of the electronic device may determine whether a common period calculated from pieces of application-related information arrives. If the common period arrives, the electronic device may determine that an event for which periodic scheduling processing is required has occurred.

If an event for which periodic scheduling processing is required occurs, the electronic device may control event processing by the communication processor in step 803.

During an installation or update process of an application, it may be determined whether the communication processor is required for periodic scheduling event processing.

For an event processing operation by the communication processor, the electronic device determines whether activation of the application processor is required in step 805. For example, the communication processor of the electronic device may be in a standby state in relation to event processing requested by a server device or aperiodic event processing. If the event processing requested by the server device or the aperiodic event processing is required, the communication processor may determine whether an event requested by the server device or an aperiodic event requires processing by the application processor in step 805.

If processing by the application processor and activation of the application processor is required, the electronic device wakes up or activates the application processor and transfers an event to the application processor in step 807.

In step 809, the electronic device controls event processing by the application processor.

As described above, the electronic device may determine whether activation of the application processor is required for processing a push message, upon receiving the push message from a server device while operating using the communication processor. If activation of the application processor is required for processing the push message, the electronic device may activate the application processor from a sleep state. The electronic device may then output the received push message or transfer the received push message to a corresponding application corresponding to control by the application processor.

Figure 9:
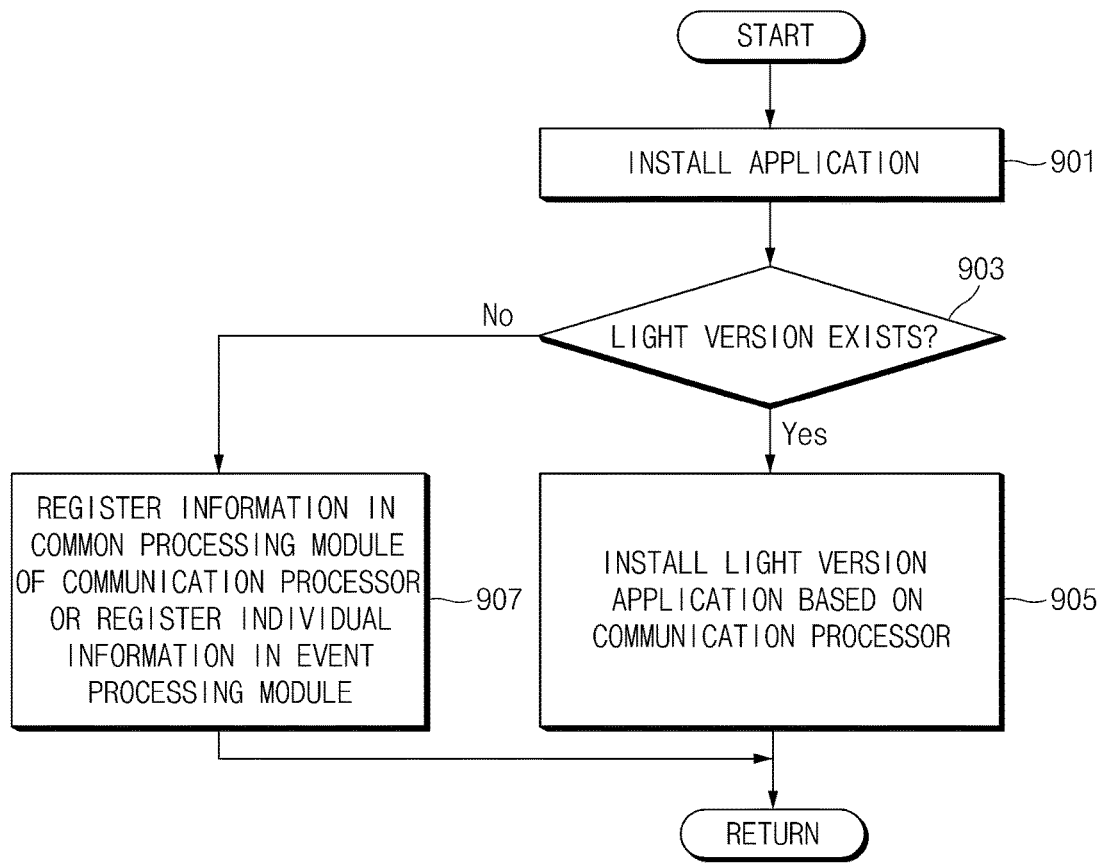
FIG. 9 is a flowchart illustrating a method for reducing current consumption using a light-version application according to an embodiment of the present disclosure.

FIG. 9 is a flowchart illustrating a method for reducing current consumption using a light-version application according to an embodiment of the present disclosure.

Referring to FIG. 9, an electronic device installs an application in step 901. For example, the electronic device may receive files related to installation of the application from another electronic device or a server device. Alternatively, while files related to a specific application are stored in a memory, the electronic device may install the application if an event related to installation of the application is received.

In the above-described operation, an application processor of the electronic device may support processing related to installation of the application.

Further, a communication processor of the electronic device may receive a file of the application from a server device. In this case, the application processor may be in a sleep state or an active state. If reception of the file of the application is completed, the communication processor may request the application processor to install the application. If the application processor is in a sleep state, the communication process may first activate the application processor.

When a program is designed to be installed upon reception of the file of the application, the communication processor may transfer the received file of the application to the application processor, which then installs the application based on the received file.

In step 903, the electronic device determines whether a light version of the application exists. For example, the electronic device may request a light version from a web store or a server device that has provided the application.

After the application is installed in the electronic device, the server device or the web store may automatically provide the electronic device with information indicating whether a light version related to the application exists.

Alternatively, the server device or the web store may automatically provide the electronic device with information related to installation of a light version of the application.

A file related to installation of the application may contain light version installation guidance information. Accordingly, if installation of the application is completed, the electronic device may output the guidance information to a display.

If the light version exists and installation thereof is requested by the user, the electronic device controls the light version of the application to be installed by the communication processor in step 905. For example, the communication processor may install the light version of the application in a memory area assigned in relation to operation of a function. If installation of the light version is completed, the communication processor may transfer installation completion information of the application light version to the application processor. The application processor may then set an API so that communication between the installed application and the light version is enabled.

For example, when entering a sleep state, the application processor may request the communication processor to operate the light version of the application, using the set API. The communication processor may store, in an assigned memory, data generated according to operation of the light version. If the application processor is later activated, the communication processor may provide the stored data to the application processor to request a data update of the application.

Alternatively, as an event (e.g., user input) for requesting activation of the application occurs, the communication processor may receive an update data confirmation request related to the application from the application processor, and may transfer relevant update data to the application processor in response to the update data confirmation request.

If there is no light version related to the application in step 903, the application processor of the electronic device registers information in a common processing module of the communication processor or may register individual information in a processing module allocated to the communication processor for each application in step 907.

For example, the application processor may collect application-related information related to periodic scheduling processing of the installed application, and transfer the collected application-related information to the common processing module or the processing module via a processor interface.

Figure 10:
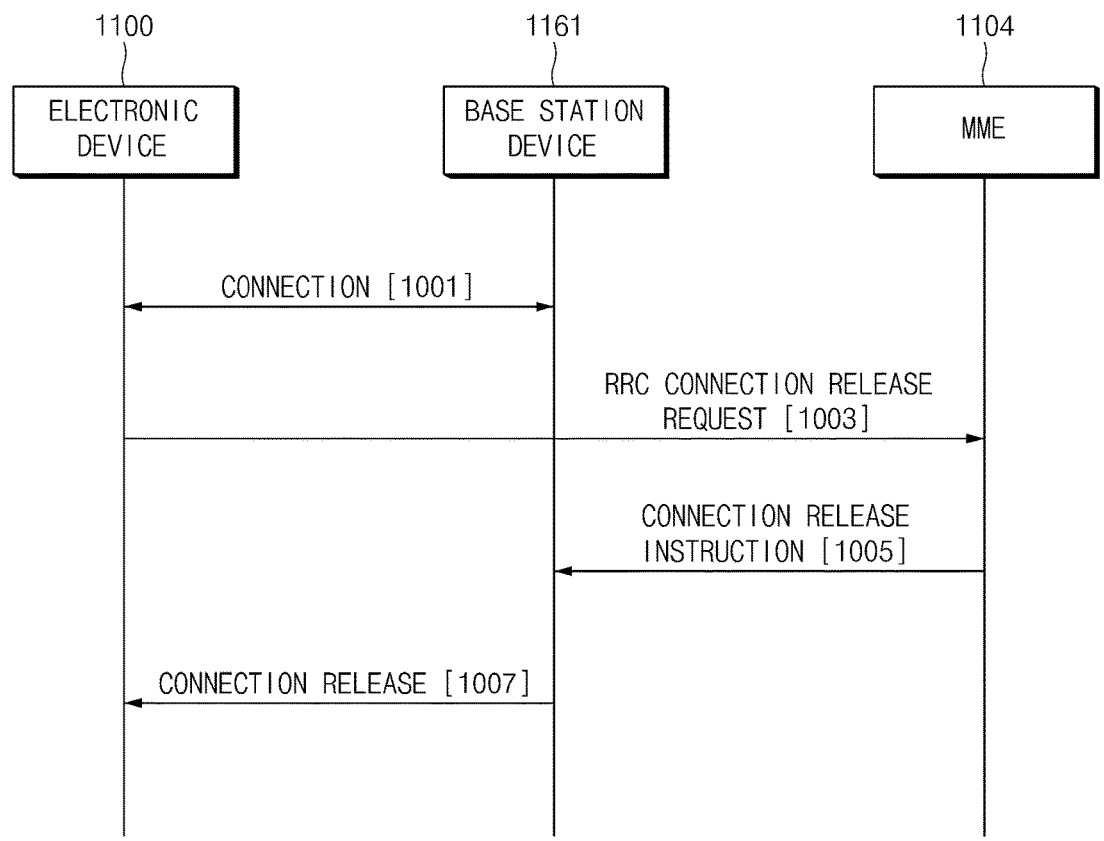
FIG. 10 is a signal flow diagram illustrating a method for reducing current consumption during a channel releasing operation according to an embodiment of the present disclosure.

FIG. 10 is a signal flow diagram illustrating a method for reducing current consumption during a channel releasing operation according to an embodiment of the present disclosure.

Referring to FIG. 10, in step 1001, an electronic device 1100 is connected to a base station device 1161. For example, the electronic device 1100 requests the base station device 1161 to assign a communication channel, and is assigned the communication channel in response to the request. The electronic device 1100 may then perform data transmission or data reception corresponding to a user input event or a scheduling event through the assigned communication channel.

In step 1001, it is assumed that a communication processor of the electronic device 1100 is connected to the base station device 1161 for periodic scheduling event processing.

A mobility management entity (MME) 1104 is connected to the base station device 1161 in relation to mobility of the electronic device 1100.

In step 1003, the electronic device 1100 sends an RRC channel release request to the MME 1104 via the base station device 1161. For example, if the electronic device 1100 has transmitted a message corresponding to a periodic scheduling event, the electronic device 1100 may transmit an RRC channel release request message to the MME 1104. If a specified interval elapses after a message related to periodic scheduling event processing is transmitted, the electronic device 1100 may also transmit the RRC channel release request message to the MME 1104.

Upon receiving the message related to the periodic scheduling event and the RRC channel release request message from the electronic device 1100, the MME 1104 to transfers a connection release instruction to the base station device 1161, in response the received RRC channel release request message, in step 1005.

In step 1007, the base station device 1161 releases the connection to the electronic device 1100, based on the connection release instruction from the MME 1104.

FIG. 11 illustrates an example of message types related to a channel release according to an embodiment of the present disclosure.

An electronic device may request an MME to release an RRC channel in relation to periodic scheduling event processing, e.g., as described above with reference to FIG. 10. Accordingly, the electronic device may generate the RRC channel release request message as illustrated in FIG. 11, and may transmit this message to the MME.

Referring to FIG. 11, the illustrated message types relate to an evolved packet system (EPS) mobility management (EMM) message defined for LTE communication.

Upon receiving a specified EMM message from the electronic device, the MME may command an RRC channel to be released. The electronic device may define a specific message area included in an EMM message between MMEs in order to use the specific message area as the RRC channel release request message. For example, the electronic device may adjust a message area value of at least one of attach reject, detach request, tracking area update reject, EMM status and EMM information among EMM message areas to a specified value, and may transmit the adjusted value to the MME.

A new message type similar to the EMM message types of FIG. 11 may also be defined after the EMM message of FIG. 11 is transmitted, in order to transmit a message of a newly defined type as the RRC channel release request message to the MME.

Figure 12:
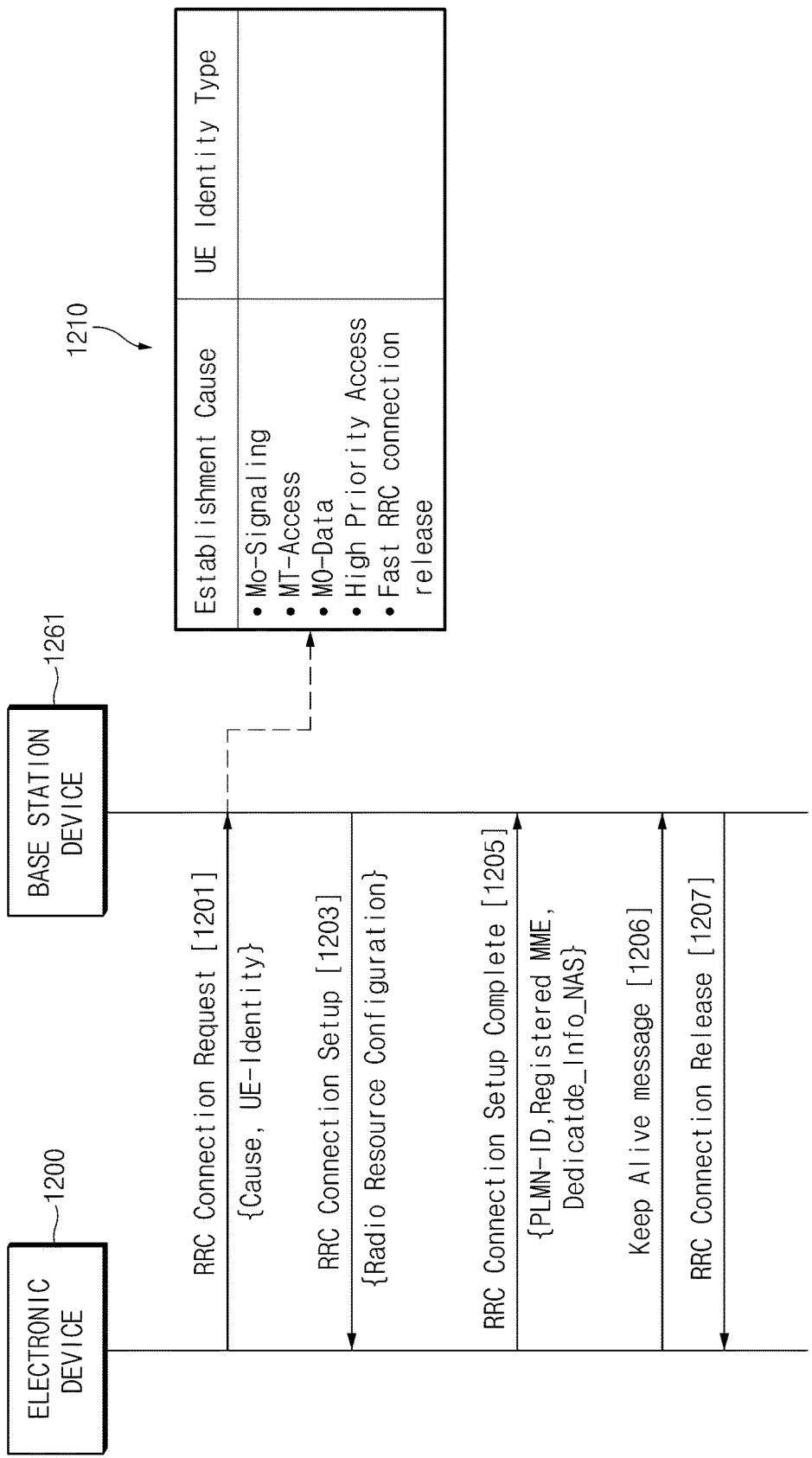
FIG. 12 is a signal flow diagram illustrating a method for reducing current consumption during a channel setting operation according to an embodiment of the present disclosure.

FIG. 12 is a signal flow diagram illustrating a method for reducing current consumption during a channel setting operation according to an embodiment of the present disclosure.

Referring to FIG. 12, in step 1201, an electronic device 1200 transmits an RRC connection request message to a base station device 1261. For example, the RRC connection request message may be defined as a type 1210, wherein the electronic device 1200 adds fast RRC connection release to MO-signaling, MT-Access, MO-data, and high priority access (LTE RRC connection request message standard) as a reason for requesting RRC channel establishment in the RRC connection request message.

MO (Mobile Originated)-Signaling: Corresponding NAS (non-access stratum) procedures are Attach, Detach, and TAU (Tracking Area Update)

MO-Data: Corresponding NAS Procedures are "Service Request" and "Extended Service Request"

MT (Mobile Terminal)-Access: Corresponding NAS procedures are "Service Request" (paging response for PS (Packet-Switching) domain) or "Extended Service Request" (MT-CS (Mobile Terminal-Circuit Switching) fallback)

Upon receiving a message containing channel establishment reasons including fast RRC connection release from the electronic device 1200, the base station device 1261 may perform additional management on the electronic device 1200. For example, upon receiving a message related to fast RRC connection release, the base station device 1261 may register identification information of the electronic device 1200 in a list related to RRC connection release.

In step 1203, the base station device 1261 transmits an RRC connection setup message to the electronic device 1200. The RRC connection setup message may include radio resource configuration information. The electronic device 1200 may perform communication channel setting corresponding to the received radio resource configuration information. For example, the electronic device 1200 may search for adjacent base stations, and perform base station selection.

When channel setting is completed, the electronic device 1200 transmits an RRC connect setup complete message to the base station device 1261 in step 1205. The RRC connection setup complete message may include a PLMN-ID (cell ID selected by the electronic device 1200), registered MME, dedicated_info_NAS, etc.

In step 1206, the electronic device 1200 transmits a periodic scheduling event message, such as a keep alive message, to the base station device 1261 through a channel to the base station device 1261.

When a keep alive event is completed, in step 1207, the base station device 1261 quickly performs an RRC connection release at an appropriate time, because the base station device 1261 is aware in advance that an RRC connection reason is transmission of the keep alive message. Specifically, the base station device 1261 transmits an RRC connection release message to the electronic device 1200.

Figure 13:
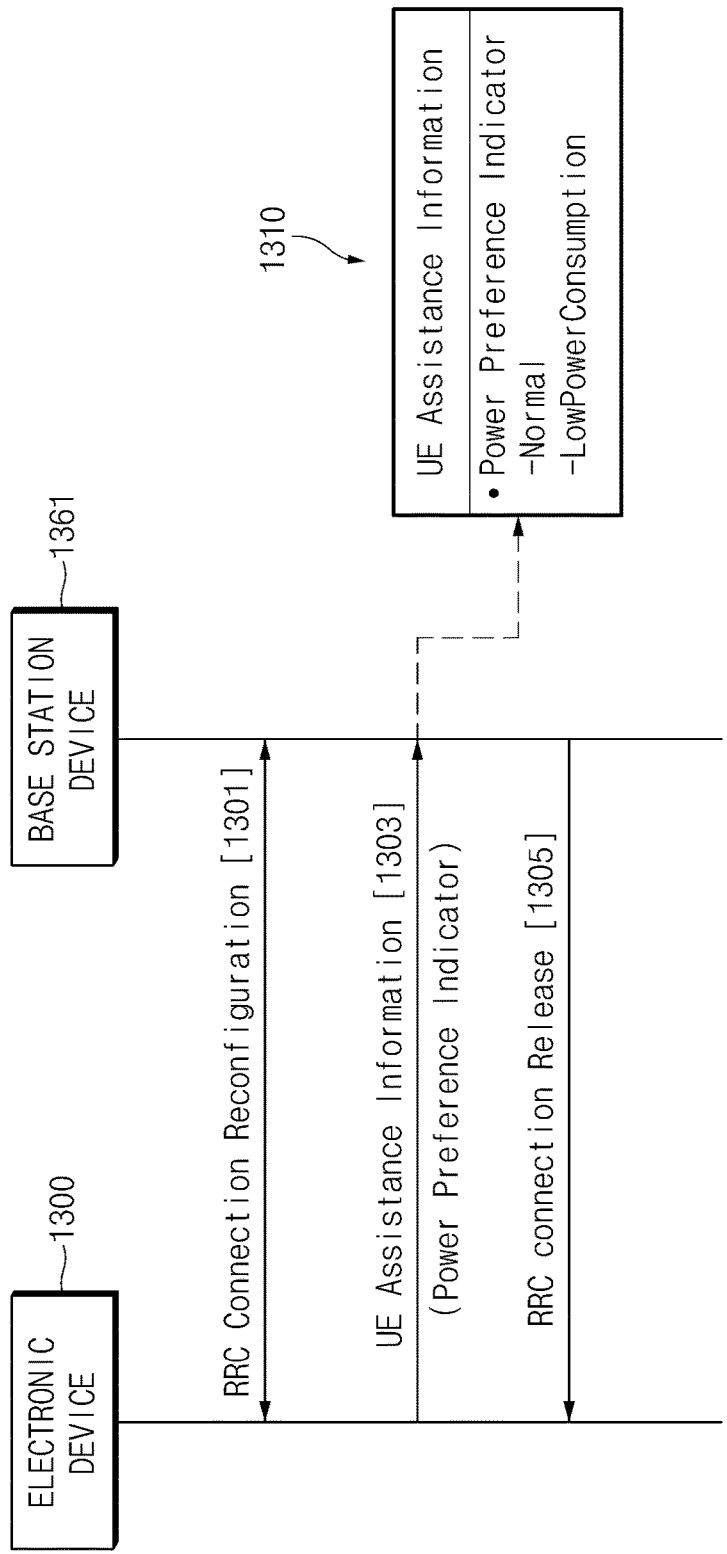
FIG. 13 is a signal flow diagram illustrating a method for reducing current consumption during a message setting operation according to an embodiment of the present disclosure.

FIG. 13 is a signal flow diagram illustrating a method for reducing current consumption during a message setting operation according to an embodiment of the present disclosure. Referring to FIG. 13, an electronic device 1300 and a base station device 1361 connect to each other based on an RRC connection reconfiguration in step 1301. For example, the electronic device 1300 may transmit a message related to periodic scheduling event processing to the base station device 1361.

In step 1303, the electronic device 1300 transmits UE assistance information to the base station device 1361 with a message related to periodic scheduling event processing or within a specified time after transmission of the message. The UE assistance information includes a power preference indicator as shown in a type 1310.

In the type 1310, the power preference indicator of the UE assistance information includes LowPowerConsumption information for requesting a quick channel release for low-power channel operation in relation to a channel being operated.

Upon receiving the UE assistance information related to the power preference indicator including the LowPowerConsumption information from the electronic device 1300, the base station device 1361 transmits an RRC connection release message to the electronic device 1300 in step 1305.

As described above, a communication processor may obtain information on a message transmission time in order to send a connection release request message. For example, the communication processor may obtain a message transmission time from an application. In this case, the electronic device including the communication processor may also include an information exchange API defined for information exchange between the communication processor and the application.

The communication processor may receive, from the application, at least one of a periodic packet such as sync or keepalive, an indication of non-existence of a following packet, a transmission period of a periodic packet, an indication of non-existence of following transmission data, and an indication of non-existence of following reception is data based on the information exchange API.

Figure 14:
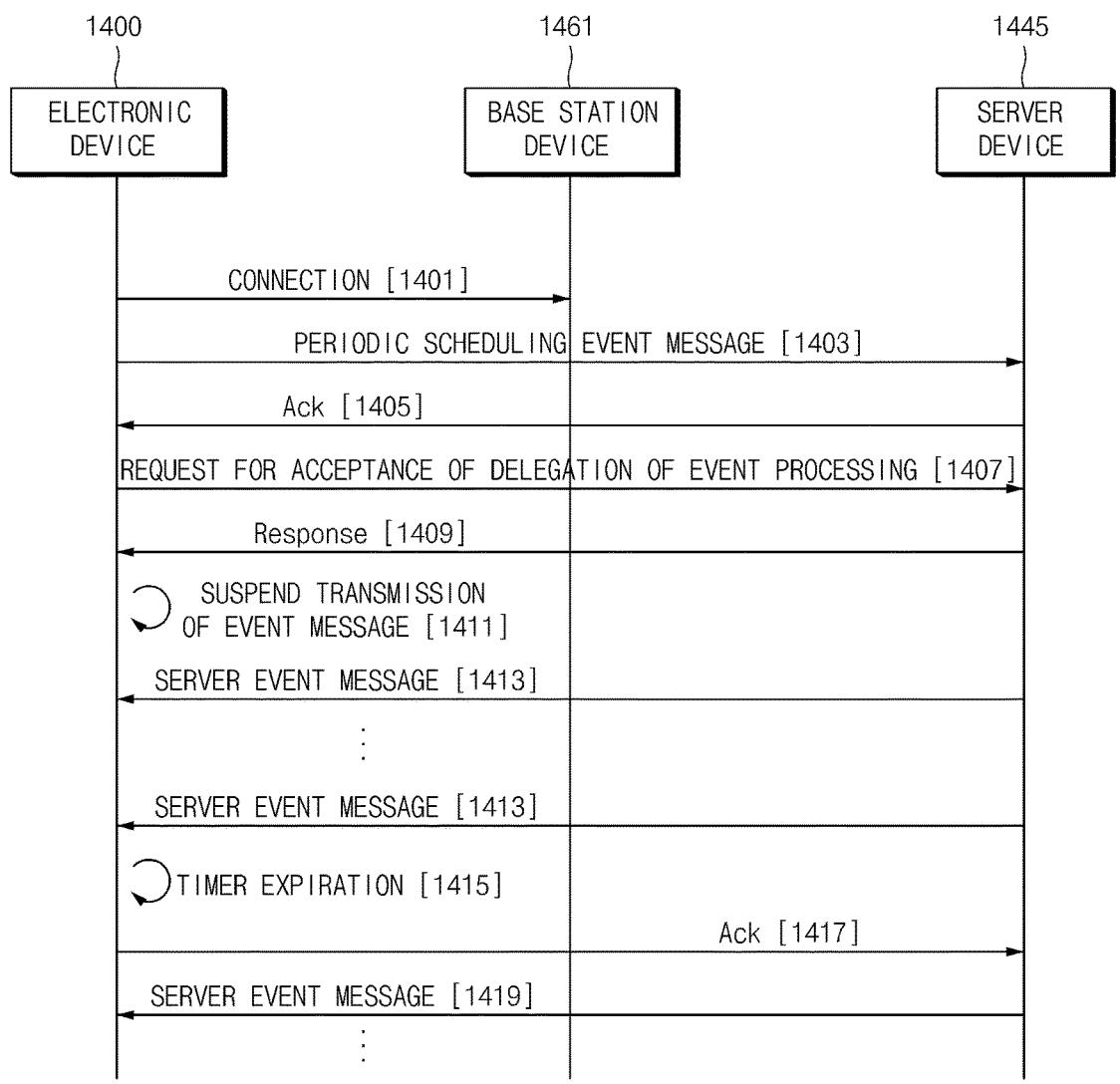
FIG. 14 is a signal flow diagram illustrating a method for reducing current consumption during an event processing delegating operation according to an embodiment of the present disclosure.

FIG. 14 is a signal flow diagram illustrating a method for reducing current consumption during an event processing delegating operation according to an embodiment of the present disclosure.

Referring to FIG. 14, in step 1401, an electronic device 1400 is connected to a base station device 1461. For example, the electronic device 1400 may request allocation of a channel for a connection to the base station device 1461, e.g., in order to transmit a message related to a periodic scheduling event. If a plurality of periodic scheduling events exist, the electronic device 1400 may calculate a common transmission period of relevant events, and then may request channel allocation at the common transmission period.

In step 1403, the electronic device 1400 transmits a message related to the periodic scheduling event to a server device 1445 via the base station device 1461. If the electronic device 1400 transmits a message based on information related to a plurality of applications, the electronic device 1400 may generate the message such that the message includes information related to periodic scheduling event processing for each of the plurality of applications. For example, the message may include information such as the number of the applications, the types of the applications, a confirmation request for each application, etc.

In step 1405, the server device 1445 transmits a response message (i.e., an ACK) to the electronic device 1400, in response to the received message related to the periodic scheduling event. When the message has been provided based on information related to a plurality of applications, the server device 1445 may provide a common ACK of the applications, or the server device 1445 may provide only one ACK to the electronic device 1400 corresponding to pre-configuration (or protocol) with the electronic device 1400.

In step 1407, the electronic device 1400 transmits a message for requesting acceptance of delegation of event processing (e.g., a message for confirming whether acceptance of delegation of event processing is available) to the server device 1445.

In step 1409, if the delegation of event processing is acceptable, the server device 1445 transmits a response message accepting the delegation of event processing to the electronic device 1400.

In step 1411, upon receiving the response message from the server device 1445, the electronic device 1400 suspends transmission of an event message related to periodic scheduling event processing.

After transmitting the response message to the electronic device 1400, the server device 1445 may generate a server event message related to a periodic scheduling event.

In step 1413, the server device 1445 transmits the generated server event message to the electronic device 1400. The server device 1445 may transmit the server event message to the electronic device 1400 corresponding to a transmission period requested by the electronic device 1400, a transmission period related to the type of the corresponding event, or a specified transmission period.

Alternatively, the electronic device 1400 does not respond to the server event message transferred from the server device 1445, and/or the server device 1445 does not wait for a response to the message.

Additionally, the electronic device 1400 may operate a specified timer after suspending transmission of the event message. While the timer of the electronic device 1400 is operated, the electronic device 1400 may receive at least one server event message from the server device 1445.

In step 1415, the electronic device 1400 may confirm expiration of the timer.

In step 1417, the electronic device 1400 transmits a specified response message (i.e., an ACK) to the server device 1445 in response to the expiration of the timer.

As the server device 1445 receives the response message ACK from the electronic device 1400, the server device 1445 may determine that the electronic device 1400 is in an available state (e.g., a communication-enabled state).

In step 1419, the server device 1445 periodically transmits the server event message to the electronic device 1400, in response to receiving the response message ACK.

The server device 1445 may periodically transmit the server event message for a period of time corresponding to a policy defined in the server device 1445 or until an additional release request related to delegation of event processing is received from the electronic device 1400.

Figure 15:
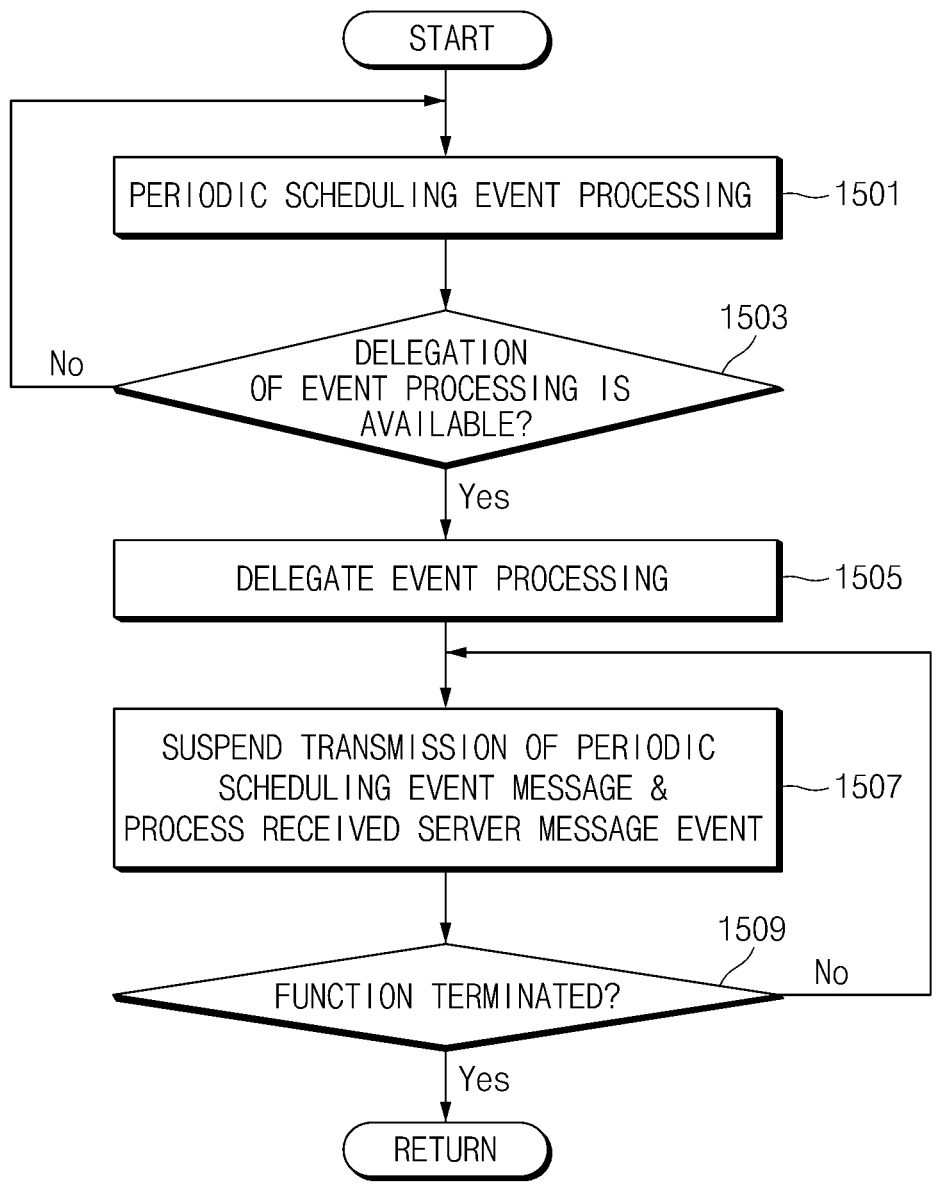
FIG. 15 is a flowchart illustrating a method of an electronic device for reducing current consumption by delegating event processing according to an embodiment of the present disclosure.

FIG. 15 is a flowchart illustrating a method of an electronic device for reducing current consumption by delegating event processing according to an embodiment of the present disclosure.

Referring to FIG. 15, in step 1501, an electronic device performs periodic scheduling event processing. For example, if a periodic scheduling event of at least one application occurs, according to arrival of a specified period, the electronic device may establish a communication channel to a base station device and transmit a message related to the periodic scheduling event to the base station device through the established communication channel. The electronic device may then receive a response message, for example, an ACK, from the base station device, in response to the transmitted message.

In step 1503, the electronic device requests a server device at to whether the server device is available for accepting delegation of event processing. For example, the electronic device may send, to the server device, a query as to whether delegation of event processing is acceptable. If the server device is available for acceptance of delegation of event processing, the electronic device may receive a response message, for example, "response(ok)". However, if the server device is not available for acceptance of delegation of event processing, the operation returns to step 1501 and the electronic device performs periodic scheduling event processing.

The electronic device may transmit the request for delegation of event processing to the server device at a specified time point after an initial transmission of the message related to the periodic scheduling event or at a time point corresponding to a user input.

Upon receiving the response message indicating that delegation of event processing is acceptable from the server device in step 1503, the electronic device delegates the event processing to the server device in step 1505. For example, the electronic device may transmit, to the server device, a message requesting acceptance of the delegation of event processing.

In step 1507, the electronic device suspends transmission of a message related to periodic scheduling event processing. Further, the electronic device processes a server event message received from the server device. A transmission period of the server event message may be determined corresponding to at least one of a period specified by the electronic device or a period specified by the server device.

The electronic device may ignore the server event message received at a fixed period.

Alternatively, the electronic device may ignore the server event message for a specified time (e.g., a specified timer driving time), and may transmit a response message to the server device after the elapsed time.

Alternatively, the electronic device may transmit a message related to periodic scheduling event processing to the server device after the specified time elapses.

In step 1509, the electronic device determines whether an event related to function termination occurs. If the event related to function termination does not occur, the operation returns to step 1507. However, if the event related to function termination occurs, the electronic device may perform a specified user function (e.g., the operation may return to step 1501).

The event related to function termination may include an event in which an application processor of the electronic device is activated, an occurrence of specified user input or scheduling, etc.

Alternatively, the event related to function termination may be reception of a message determined corresponding to a policy of the server device.

Figure 16:
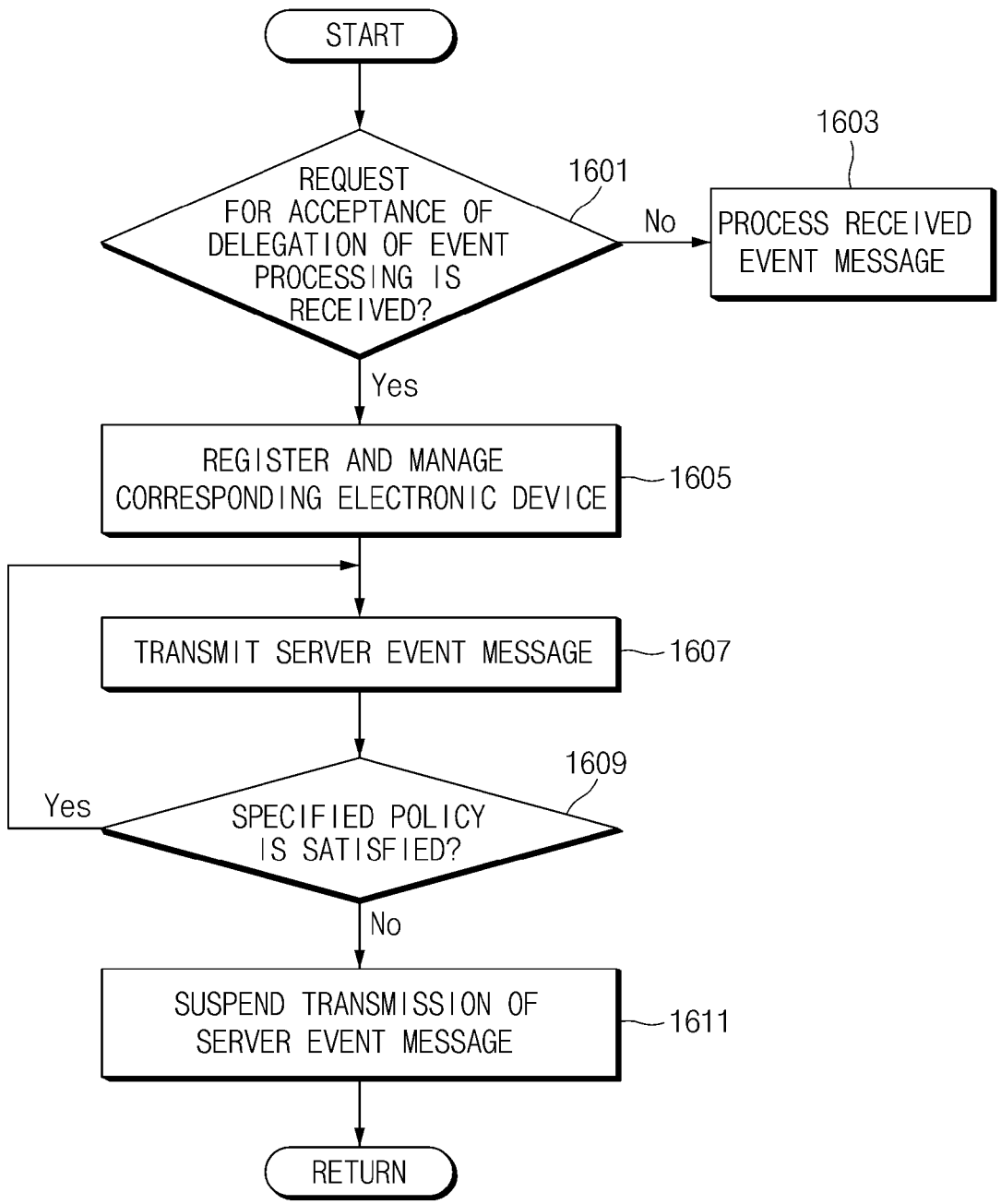
FIG. 16 is a flowchart illustrating a method of a server device for reducing current consumption by delegating event processing according to an embodiment of the present disclosure.

FIG. 16 is a flowchart illustrating a method of a server device for reducing current consumption by delegating event processing according to an embodiment of the present disclosure.

Referring to FIG. 16, in step 1601, a server device determines whether a request related to delegation of event processing is received. For example, the server device may determine whether a query related to delegation of event processing is received from a specific electronic device. If a request message is not received, the server device process a received event message in step 1603. For example, upon receiving a message related to periodic scheduling event processing from the electronic device, the server device may perform a responding operation.

Upon receiving a request to accept delegation of event processing, the server device performs registration and management of the electronic device in step 1605. For example, the server device may register and manage application-related information and identification information of the electronic device that has requested acceptance of delegation of event processing.

In step 1607, the server device transmits a server event message. The server device may check a transmission period of a periodic scheduling event to be processed in relation to applications of the specific electronic device. If the transmission period arrives, the server device may generate a server event message, and transmit the generated server event message to the electronic device.

In step 1609, the server device determines whether a situation that satisfies a specified policy occurs. For example, the server device may prepare a policy for terminating delegation of event processing of the electronic device, and may determine whether the policy is satisfied. For example, the server device may determine whether a number of transmissions or a transmission interval of the server event message exceeds a specified number or time, a response message is unable to be received from the electronic device within a specified time, or a manager request is made.

If the specified policy is not satisfied in step 1609, the operation returns to step 1607. However, if a situation that satisfies the specified policy occurs in step 1609, the server device suspends transmission of the server event message in step 1611. If delegation of event processing is terminated, the server device may receive a message related to a periodic scheduling event from the electronic device, and perform a responding operation.

Figure 17:
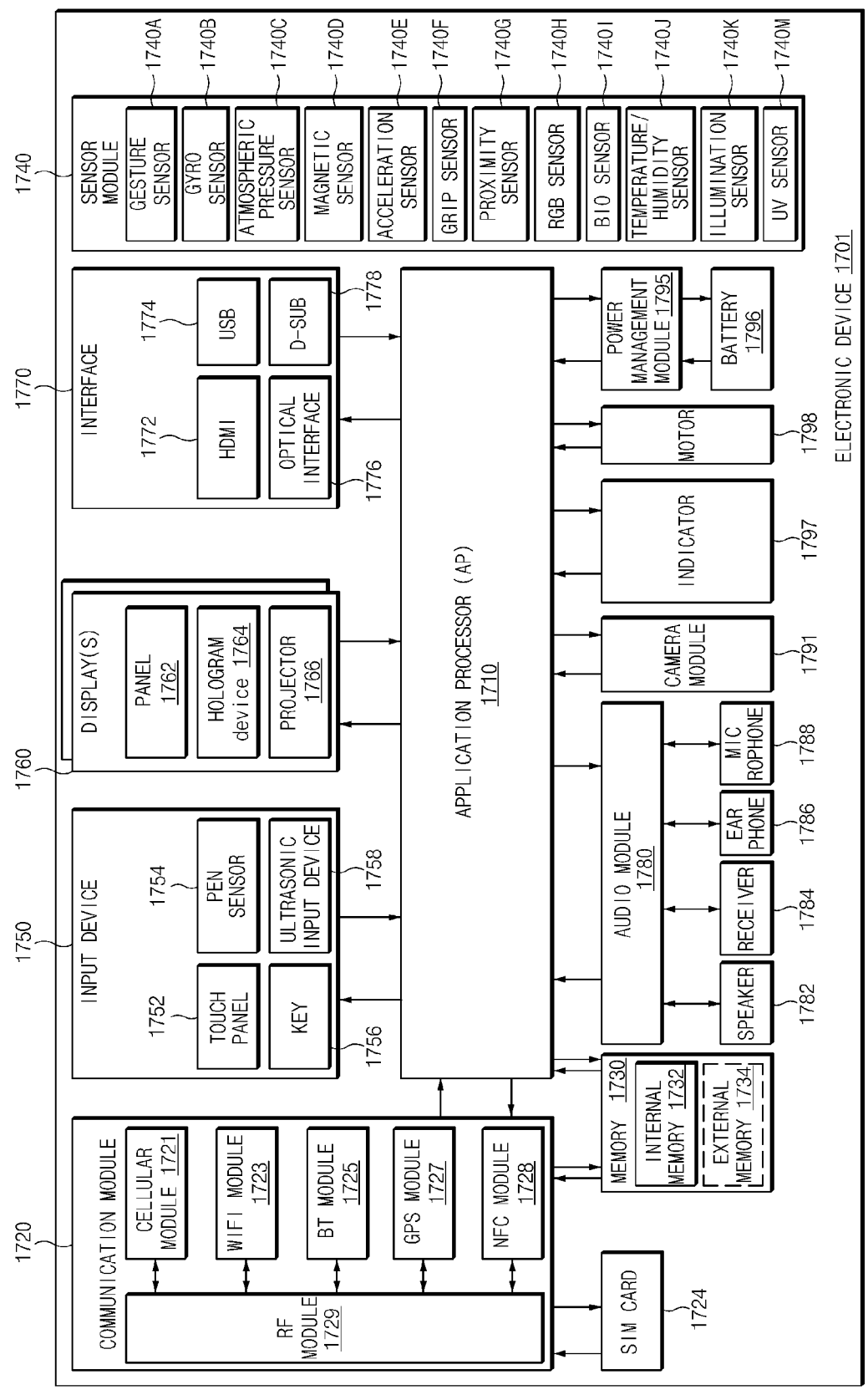
FIG. 17 illustrates an electronic device according to an embodiment of the present disclosure.

FIG. 17 illustrates an electronic device according to an embodiment of the present disclosure.

Referring to FIG. 17, an electronic device 1701 an application processor (AP) 1710, a communication module 1720, a subscriber identification module (SIM) card 1724, a memory 1730, a sensor module 1740, an input device 1750, a display 1760, an interface 1770, an audio module 1780, a camera module 1791, a power management module 1795, a battery 1796, an indicator 1797, and a motor 1798.

The AP 1710 may run an OS or an application program in order to control a plurality of hardware or software elements connected to the AP 1710, and may process various data and may perform an operation thereon. The AP 1710 may be implemented with, for example, a system on chip (SoC). The AP 1710 includes a graphic processing unit (GPU) and/or an image signal processor. For example, the AP 1710 may also include at least a portion of the other elements illustrated in FIG. 17 (e.g., the cellular module 1721).

The AP 1710 may load, on a volatile memory, an instruction or data received from at least one of other elements (e.g., a nonvolatile memory) to process the instruction or data, and may store various data in a nonvolatile memory.

The communication module 1720 may have a configuration that is the same as or similar to that of the communication interface 160 of FIG. 1. The communication module 1720 includes, for example, a cellular module 1721, a Wi-Fi® module 1723, a Bluetooth (BT)® module 1725, a GPS module 1727, an NFC® module 1728, and a radio frequency (RF) module 1729.

The cellular module 1721 may provide, for example, a voice call service, a video call service, a text message service, or an Internet service through a communication network. The cellular module 1721 may identify and authenticate the electronic device 1701 in the communication network using a SIM card 1724. The cellular module 1721 may perform at least a part of functions provided by the AP 1710. The cellular module 1721 may include a communication processor (CP).

Each of the Wi-Fi® module 1723, the BT® module 1725, the GPS module 1727, and the NFC® module 1728 may include, for example, a processor for processing data transmitted/received through the modules. At least a part (e.g., two or more) of the cellular module 1721, the Wi-Fi® module 1723, the BT® module 1725, the GPS module 1727, and the NFC® module 1728 may be included in a single integrated chip (IC) or IC package.

The RF module 1729 may transmit/receive, for example, communication signals (e.g., RF signals). The RF module 1729 may include, for example, a transceiver, a power amp module (PAM), a frequency filter, a low noise amplifier (LNA), an antenna, etc. At least one of the cellular module 1721, the Wi-Fi® module 1723, the BT® module 1725, the GPS module 1727, or the NFC® module 1728 may transmit/receive RF signals through a separate RF module.

The SIM card 1724 may include, for example, an embedded SIM and/or a card including a user identification module, and may include unique identification information (e.g., an integrated circuit card identifier (ICCID)) or subscriber information (e.g., international mobile subscriber identity (IMSI)).

The memory 1730 includes an internal memory 1732 or an external memory 1734. The internal memory 1732 may include at least one of a volatile memory (e.g., a dynamic RAM (DRAM), a static RAM (SRAM), a synchronous dynamic RAM (SDRAM), etc.) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid state drive (SSD)).

The external memory 1734 may include a flash drive, for example, compact flash (CF), secure digital (SD), Micro-SD, Mini-SD, extreme digital (xD), a memory stick, or the like. The external memory 1734 may be functionally and/or physically connected to the electronic device 1701 through various interfaces.

The sensor module 1740 may, for example, measure physical quantity or detect an operation state of the electronic device 1701 in order to convert measured or detected information into an electrical signal. The sensor module 1740 includes, for example, a gesture sensor 1740A, a gyro sensor 1740B, a barometric pressure sensor 1740C, a magnetic sensor 1740D, an acceleration sensor 1740E, a grip sensor 1740F, a proximity sensor 1740G, a color sensor 1740H (e.g., a red/green/blue (RGB) sensor), a biometric sensor 1740I, a temperature/humidity sensor 1740J, an illumination sensor 1740K, and an ultraviolet (UV) sensor 1740M. Additionally or alternatively, the sensor module 1740 may include an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor.

The sensor module 1740 may further include a control circuit for controlling at least one sensor included therein.

The electronic device 1701 may further include a processor configured to control the sensor module 1740 as a part of the AP 1710 or separately, so that the sensor module 1740 is controlled while the AP 1710 is in a sleep state.

The input device 1750 includes, for example, a touch panel 1752, a (digital) pen sensor 1754, a key 1756, and an ultrasonic input device 1758. The touch panel 1752 may employ at least one of capacitive, resistive, infrared, and ultraviolet sensing methods. The touch panel 1752 may further include a control circuit. The touch panel 1752 may further include a tactile layer so as to provide tactile reaction to a user.

The (digital) pen sensor 1754 may include, for example, a sheet for recognition which is a part of a touch panel or is separate. The key 1756 may include, for example, a physical button, an optical button, or a keypad. The ultrasonic input device 1758, which employs an input tool for generating an ultrasonic signal, may enable the electronic device 1701 to sense a sound wave through a microphone 1788 so as to identify data.

The display 1760 includes a panel 1762, a hologram device 1764, and a projector 1766. The panel 1762 may have a configuration that is the same as or similar to that of the display 150 of FIG. 1. The panel 1762 may be, for example, flexible, transparent, or wearable. The panel 1762 and the touch panel 1752 may be integrated into a single module.

The hologram device 1764 may display a stereoscopic image in a space using a light interference phenomenon.

The projector 1766 may project light onto a screen so as to display an image. The screen may be disposed in the inside or the outside of the electronic device 1701.

The display 1760 may further include a control circuit for controlling the panel 1762, the hologram device 1764, or the projector 1766.

The interface 1770 includes, for example, a high definition multimedia interface (HDMI) 1772, a USB 1774, an optical interface 1776, or a D-subminiature (D-sub) 1778. Additionally or alternatively, the interface 1770 may include, for example, a mobile high-definition link (MHL) interface, an SD card/multi-media card (MMC) interface, or an infrared data association (IrDA) interface.

The audio module 1780 may convert, for example, a sound into an electrical signal or vice versa. At least a part of elements of the audio module 1780 may be included in the input/output interface 140 illustrated in FIG. 1. The audio module 1780 may process sound information input or output through a speaker 1782, a receiver 1784, an earphone 1786, or the microphone 1788.

The camera module 1791 shoots a still image or a video. For example, the camera module 1791 may include at least one image sensor (e.g., a front sensor or a rear sensor), a lens, an image signal processor (ISP), or a flash (e.g., an LED or a xenon lamp).

The power management module 1795 manages power of the electronic device 1701. For example, the power management module 1795 may include a power management integrated circuit (PMIC), a charger IC, or a battery gauge. The PMIC may employ a wired and/or wireless charging method. The wireless charging method may include, for example, a magnetic resonance method, a magnetic induction method, an electromagnetic method, etc. An additional circuit for wireless charging, such as a coil loop, a resonant circuit, a rectifier, etc., may be further included. The battery gauge may measure, for example, a remaining capacity of the battery 1796 and a voltage, current or temperature thereof while the battery is charged. The battery 1796 may include, for example, a rechargeable battery and/or a solar battery.

The indicator 1797 may display a specific state of the electronic device 1701 or a part thereof (e.g., the AP 1710), such as a booting state, a message state, a charging state, or the like.

The motor 1798 may convert an electrical signal into a mechanical vibration, and may generate a vibration or haptic effect.

Although not illustrated, a processing device (e.g., a GPU) for supporting a mobile TV may be included in the electronic device 1701. The processing device for supporting a mobile TV may process media data corresponding to the standards of digital multimedia broadcasting (DMB), digital video broadcasting (DVB), or MediaFLO®.

Each of the above-mentioned elements of the electronic device may be configured with one or more components, and the names of the elements may be changed according to the type of the electronic device. In various embodiments of the present disclosure, the electronic device may include at least one of the above-mentioned elements, and some elements may be omitted or other additional elements may be added. Further, some of the elements of the electronic device according to various embodiments of the present disclosure may be combined with each other so as to form one entity, so that the functions of the elements may be performed in the same manner as before the combination.

Figure 18:
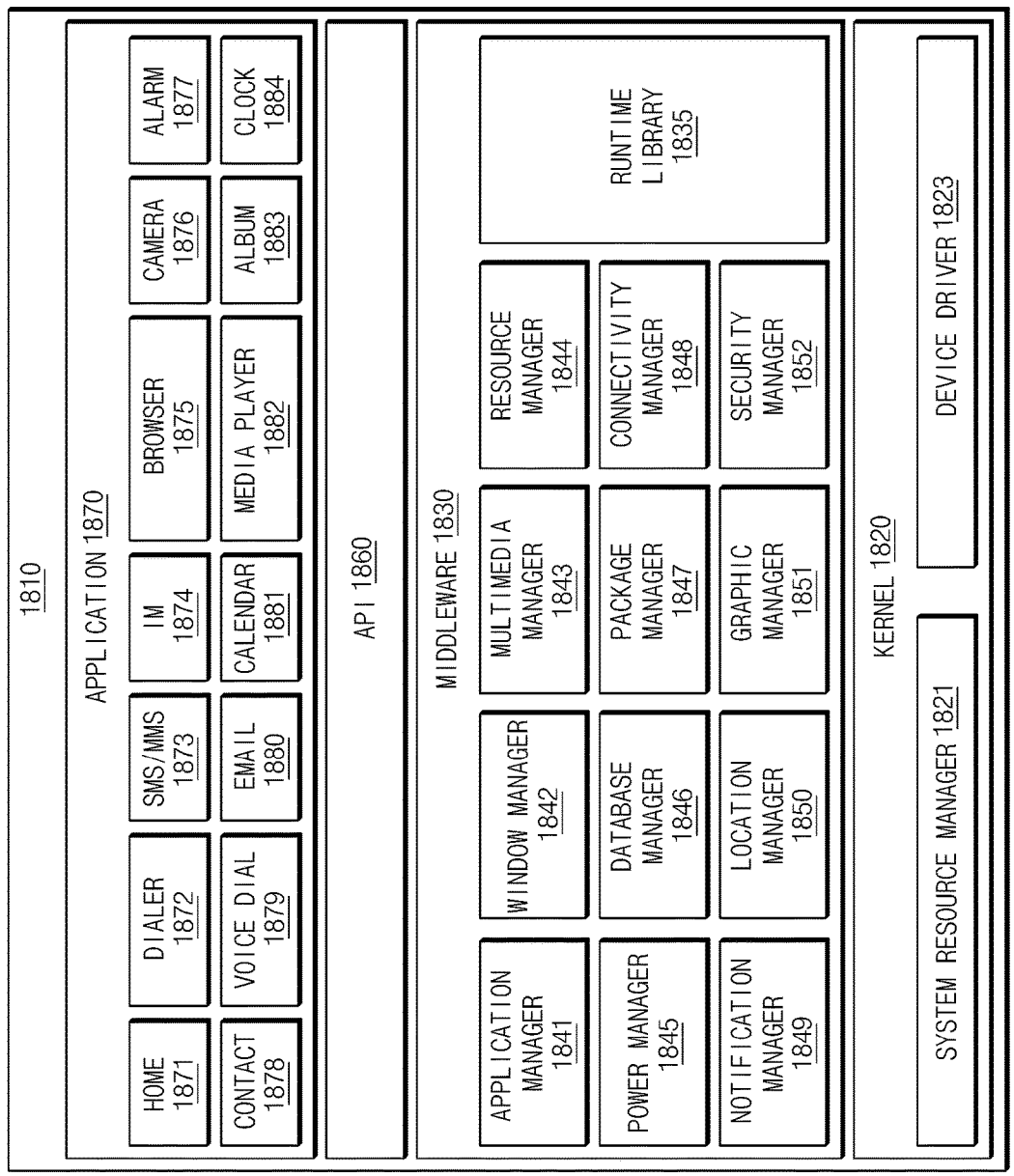
FIG. 18 illustrates a program module according to an embodiment of the present disclosure.

FIG. 18 illustrates a program module according to an embodiment of the present disclosure.

Referring to FIG. 18, a program module 1810 includes an OS for controlling a resource related to an electronic device (e.g., the electronic device 100) and/or various applications (e.g., the application 38) running on the OS. The OS may be, for example, Android®, iOS®, Windows®, Symbian®, Tizen®, Bada®, etc. The program module 1810 may include the OS and an application 1870. The OS may include a kernel 1820, a middleware 1830, and API 1860. At least a part of the program module 1810 may be preloaded on an electronic device or may be downloaded from a server.

The kernel 1820 includes, for example, a system resource manager 1821 and a device driver 1823. The system resource manager 1821 may perform control, allocation, or retrieval of a system resource. The system resource manager 1821 may include a process management unit, a memory management unit, or a file system management unit.

The device driver 1823 may include, for example, a display driver, a camera driver, a Bluetooth driver, a shared memory driver, a USB driver, a keypad driver, a Wi-Fi® driver, an audio driver, or an inter-process communication (IPC) driver.

The middleware 1830, for example, may provide a function that the application 1870 requires commonly, or may provide various functions to the application 1870 through the API 1860 in order to allow the application 1860 to efficiently use a limited system resource inside the electronic device. The middleware 1830 includes a runtime library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, and a security manager 1852.

The runtime library 1835, for example, may include a library module that a complier uses to add a new function through a programming language while the application 1870 is running. The runtime library 1835 may perform a function for input/output management, memory management, or an arithmetic function.

The application manager 1841, for example, may mange a life cycle of at least one of the applications 1870.

The window manager 1842 may manage a GUI resource used in a screen.

The multimedia manager 1843 may recognize a format required for playing various media files and may encode or decode a media file using a codec matched to the format.

The resource manager 1844 may manage a resource such as a source code, a memory, or a storage space of at least one of the applications 1870.

The power manager 1845 may operate together with a basic input/output system (BIOS) to manage a battery or power and may provide power information required for operating the electronic device.

The database manager 1846 may generate, search, or modify a database to be used in at least one of the applications 1870.

The package manager 1847 may manage installation or update of an application distributed in a package file format.

The connectivity manger 1848 may manage wireless connection of Wi-Fi® or Bluetooth®.

The notification manager 1849 may display or notify an event such as arrival messages, appointments, and proximity alerts in such a manner as not to disturb a user.

The location manager 1850 may manage location information of an electronic device.

The graphic manager 1851 may manage a graphic effect to be provided to a user or a user interface related thereto.

The security manager 1852 may provide various security functions required for system security or user authentication.

When an electronic device includes a phone function, the middleware 1830 may further include a telephony manager for managing a voice or video call function of the electronic device.

The middleware 1830 may include a middleware module for forming a combination of various functions of the above-mentioned elements. The middleware 1830 may provide a module specialized for each type of OS to provide differentiated functions. Further, the middleware 1830 may delete a part of existing elements or add new elements dynamically.

The API 1860, which is a set of API programming functions, may be provided in different configurations according to the OS. For example, in the case of Android® or iOS®, one API set may be provided for each platform, and, in the case of Tizen®, at least two API sets may be provided for each platform.

The application 1870, for example, includes at least one application for providing functions such as a home function 1871, a dialer function 1872, an short message service/multimedia message service (SMS/MMS) function 1873, an instant message function 1874, a browser function 1875, a camera function 1876, an alarm function 1877, a contact function 1878, a voice dial function 1879, an e-mail function 1880, a calendar function 1881, a media player function 1882, an album function 1883, a clock function 1884, health care function (e.g., measuring an exercise amount or blood sugar), or environmental information provision function (e.g., providing air pressure, humidity, or temperature information).

The application 1870 may include an application for supporting information exchange between the electronic device and an external electronic device (hereinafter "information exchange application"). The information exchange application may include a notification relay application for relaying specific information to the external device or a device management application for managing the external electronic device.

For example, the notification relay application may have a function for relaying, to an external electronic device, notification information generated in another application (e.g., an SMS/MMS application, an e-mail application, a health care application, or an environmental information application) of the electronic device. Further, the notification relay application may receive notification information from an external electronic device and may provide the received notification information to a user. The device management application, for example, may manage (e.g., install, delete, or update) at least one function (turn-on/turn off of the external electronic device itself (or some elements) or the brightness (or resolution) adjustment of a display) of the external electronic device communicating with the electronic device, an application operating in the external electronic device, or a service (e.g., call service or message service) provided from the external device.

The application 1870 may include a specified application (e.g., a health care application) according to an attribute (e.g., the type of an electronic device is a mobile medical device) of the external electronic device.

The application 1870 may also include an application received from an external electronic device or a preloaded application or a third-party application downloadable from a server.

The names of elements in the program module 1810 illustrated may vary with the type of OS.

At least a part of the program module 1810 may be implemented with software, firmware, hardware, or a combination thereof. At least a part of the programming module 1810 may be implemented (e.g., executed) by a processor (e.g., the AP 1710). At least a part of the programming module 1810 may include a module, a program, a routine, sets of instructions, or a process to perform at least one function.

At least a part of devices (e.g., modules or functions thereof) or methods (e.g., operations) according to various embodiments of the present disclosure may be implemented as instructions stored in a computer-readable storage medium in the form of a programming module. When the instructions are performed by a processor (e.g., the processor 120), the processor may perform functions corresponding to the instructions. The computer-readable storage medium may be, for example, the memory 130 as illustrated in FIG. 1.

The computer-readable recording medium may include a hard disk, a floppy disk, a magnetic medium (e.g., a magnetic tape), an optical medium (e.g., compact disc-read only memory (CD-ROM) or digital versatile disc (DVD)), a magneto-optical medium (e.g., a floptical disk), or a hardware device (e.g., a ROM, a random access memory (RAM), a flash memory, etc.).

The program instructions may include machine language codes generated by compilers and high-level language codes that can be executed by computers using interpreters.

The above-described hardware device may be configured to be operated as one or more software modules for performing operations of various embodiments of the present disclosure and vice versa.

According to an embodiment of the present disclosure, a computer-readable recording medium stores at least one instruction executable by at least one processor, wherein the instruction may be configured to perform collecting, by a communication processor, an event related to operation of at least one application while an application processor is in a sleep state and transmitting a message corresponding to the collected event to an external electronic device corresponding to control by the communication processor.

According to an embodiment of the present disclosure, a computer-readable recording medium stores at least one instruction executable by at least one processor, wherein the instruction may be configured to perform requesting, by a communication processor, quick release of a communication channel to an external electronic device when a periodic scheduling event message processed periodically in relation to operation of at least one application is transmitted and releasing the communication channel corresponding to the requesting.

According to an embodiment of the present disclosure, a computer-readable recording medium stores at least one instruction executable by at least one processor, wherein the instruction may be configured to perform collecting, by a communication processor, a periodic scheduling event processed periodically in relation to operation of at least one application while an application processor is in a sleep state and sending, by the communication processor, a request for acceptance of delegation of periodic scheduling event processing to an external electronic device.

According to an embodiment of the present disclosure, a computer-readable recording medium stores at least one instruction executable by at least one processor, wherein the instruction may be configured to perform receiving, from an electronic device, a request for acceptance of delegation of event processing in relation to a periodic scheduling event of an application and transmitting, to the electronic device, a server event message related to the periodic scheduling event at a specified period in response to the request for acceptance of delegation of event processing.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Further, some operations may be performed in another order or may be omitted, or other operations may be added.

According to various embodiments of the present disclosure, current consumption may be reduced through efficient operation of a processor in relation to event processing of an electronic device.

Further, according to various embodiments of the present disclosure, current consumption required for periodic scheduling event processing may be reduced by optimizing a timing of channel release of an electronic device.

Additionally, according to various embodiments of the present disclosure, current consumption required for periodic scheduling event processing may be reduced by delegating the periodic scheduling event processing to a server.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An electronic device comprising:
   a communication processor configured to obtain transmission periods of a plurality of applications and calculate a common period based on the transmission periods while an application processor is in a sleep state; and
   a communication interface configured to transmit messages associated with the plurality of applications, upon arrival of the common period, to an external electronic device corresponding to control by the communication processor.

2. The electronic device of claim 1, wherein the communication processor is further configured to register and manage application information including at least one of a type of the plurality of applications, the common period, and an address of the external electronic device to which the messages are to be transmitted.

3. The electronic device of claim 1, wherein the communication processor is further configured to check a message received from the external electronic device and activate the application processor corresponding to an attribute of the message in order to transfer the message to the application.

4. The electronic device of claim 1, wherein the communication processor is further configured to check a message received from the external electronic device and output the message to a display corresponding to an attribute of the message.

5. The electronic device of claim 1, wherein the communication processor comprises light-version applications installed therein, associated with the plurality of applications.

6. The electronic device of claim 1, wherein the communication processor comprises a processing module associated with the plurality of applications.

7. The electronic device of claim 1, wherein the messages comprises keep alive packets.

8. A method for reducing current consumption in an electronic device, the method comprising:
   obtaining, by a communication processor, transmission periods of a plurality of applications and calculating a common period based on the transmission periods while an application processor is in a sleep state; and
   transmitting messages associated with the plurality of applications, upon arrival of the common period to an external electronic device corresponding to control by the communication processor.

9. The method of claim 8, further comprising:
   registering and managing, by the communication processor, application-related information including at least one of a type of the plurality of applications, the common period, or an address of the external electronic device to which the messages are to be transmitted.

10. The method of claim 8, further comprising:
    checking, by the communication processor, a message received from the external electronic device;
    activating the application processor corresponding to an attribute of the message; and
    transferring the message to the application in the application processor.

11. The method of claim 8, further comprising:
    checking, by the communication processor, a message received from the external electronic device; and
    outputting the message to a display corresponding to control by the communication processor corresponding to an attribute of the message.

12. The method of claim 8, further comprising installing, by the communication processor, light-version applications associated with the plurality of applications.

13. The method of claim 8, further comprising allocating a processing module associated with the plurality of applications to the communication processor.

14. The method of claim 8, wherein the messages comprise keep alive packets.

* * * * *